US 011273607B2

(12) United States Patent
Olausson et al.

(10) Patent No.: US 11,273,607 B2
(45) Date of Patent: Mar. 15, 2022

(54) DEPOWDERING APPARATUSES FOR ADDITIVE MANUFACTURING AND METHODS FOR USING THE SAME

(71) Applicant: ARCAM AB, Moelnda (SE)

(72) Inventors: Stefan Olausson, Gothenburg (SE); Håkan Sjölander, Gothenburg (SE)

(73) Assignee: ARCAM AB, Moelnda (SE)

( * ) Notice: Subject to any disclaimer, the term of this patent is extended or adjusted under 35 U.S.C. 154(b) by 203 days.

(21) Appl. No.: 16/684,696

(22) Filed: Nov. 15, 2019

(65) Prior Publication Data
US 2021/0146621 A1  May 20, 2021

(51) Int. Cl.
| | | |
|---|---|---|
| *B29C 64/35* | (2017.01) | |
| *B29C 64/357* | (2017.01) | |
| *B29C 64/232* | (2017.01) | |
| *B29C 64/393* | (2017.01) | |
| *B33Y 50/02* | (2015.01) | |
| *B33Y 10/00* | (2015.01) | |
| *B33Y 30/00* | (2015.01) | |
| *B33Y 40/20* | (2020.01) | |

(52) U.S. Cl.
CPC ............ *B29C 64/35* (2017.08); *B29C 64/232* (2017.08); *B29C 64/357* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search
CPC ..... B29C 64/35; B29C 64/232; B29C 64/393; B33Y 10/00; B33Y 30/00; B33Y 50/02; B33Y 40/20
See application file for complete search history.

(56) References Cited

U.S. PATENT DOCUMENTS

| | | |
|---|---|---|
| 8,104,488 B2 | 1/2012 | Rye et al. |
| 8,765,045 B2 | 7/2014 | Zinniel |
| 10,061,302 B2 | 8/2018 | Jacobs et al. |
| 10,239,097 B2 | 3/2019 | Pressacco |
| 10,245,786 B2 | 4/2019 | Thresh et al. |
| 2004/0020512 A1 | 2/2004 | Hosack et al. |
| 2018/0009007 A1* | 1/2018 | Craft ................... B23K 26/702 |
| 2018/0297284 A1* | 10/2018 | Fulop .................... B29C 64/165 |
| 2019/0016045 A1* | 1/2019 | Wright ..................... B24C 1/04 |
| 2019/0176403 A1* | 6/2019 | Hutchinson ............... B24C 1/08 |
| 2019/0283183 A1 | 9/2019 | Koch et al. |
| 2019/0299362 A1 | 10/2019 | Palm |
| 2020/0122391 A1* | 4/2020 | Hertling ................ B29C 64/209 |
| 2020/0254586 A1* | 8/2020 | Sanders .................... B08B 3/12 |

* cited by examiner

Primary Examiner — Yung-Sheng M Tsui
(74) Attorney, Agent, or Firm — Dinsmore & Shohl LLP

(57) ABSTRACT

A depowdering apparatus for depowdering a cake comprising a build part includes a depowdering chamber, a blast nozzle, and a build elevator. The depowdering chamber includes a bottom surface and a build inlet extending through the bottom surface, where the build inlet includes an inlet axis that is substantially vertically oriented. The blast nozzle is positioned within the depowdering chamber and oriented to direct a fluid stream toward the inlet axis. The blast nozzle is laterally spaced from the inlet axis and operable to revolve about the inlet axis on a travel path encircling the inlet axis. The build elevator is arranged below the build inlet in a vertical direction and is operable to raise the cake comprising the build part through the build inlet and into the depowdering chamber along the inlet axis as the blast nozzle is revolved about the inlet axis on the travel path.

12 Claims, 11 Drawing Sheets

DEPOWDERING APPARATUSES FOR ADDITIVE MANUFACTURING AND METHODS FOR USING THE SAME

BACKGROUND

Field

The present specification generally relates to additive manufacturing, and more specifically, to depowdering apparatuses for additive manufacturing and methods for using the same.

Technical Background

Additive manufacturing may be utilized to "build" an object (or "build part") from build material, such as organic or inorganic powders, in a layer-wise manner. Early iterations of additive manufacturing apparatuses were used for prototyping 3 dimensional objects. However, as additive manufacturing technology has improved, there is an increased interest in utilizing additive manufacturing for large-scale commercial production of objects. One issue of scaling additive manufacturing apparatuses to commercial production is improving the throughput to meet commercial demands.

The build part, when formed, may be disposed within a cake of excess build material that must be removed in order to complete the building process. The cake is conventionally removed in a depowdering apparatus, where fluid, abrasive material, or both are directed onto the cake to remove the excess build material surrounding the build part. However, conventional depowdering apparatuses and processes may require extensive manual labor and may be time-intensive. As such, the depowdering operation may be a rate-limiting step when building an object by additive manufacturing.

Accordingly, a need exists for alternative depowdering apparatuses and components thereof that improve manufacturing throughput.

SUMMARY

In embodiments, a depowdering apparatus for depowdering a cake comprising a build part includes a depowdering chamber, a blast nozzle, and a build elevator. The depowdering chamber includes a bottom surface and a build inlet extending through the bottom surface, where the build inlet includes an inlet axis that is substantially vertically oriented. The blast nozzle is positioned within the depowdering chamber and oriented to direct a fluid stream toward the inlet axis. The blast nozzle is laterally spaced from the inlet axis and operable to revolve about the inlet axis on a travel path encircling the inlet axis. The build elevator is arranged below the build inlet in a vertical direction and is operable to raise the cake comprising the build part through the build inlet and into the depowdering chamber along the inlet axis as the blast nozzle is revolved about the inlet axis on the travel path.

In embodiments, a depowdering apparatus for depowdering a cake comprising a build part includes a depowdering chamber comprising an access port, a door assembly, a door sensor, a bottom surface and a build inlet extending through the bottom surface of the depowdering chamber. The build inlet comprises an inlet axis that is substantially vertically oriented, the access port extends through a sidewall at least partially enclosing the depowdering chamber, and the door assembly comprises a closed position and an open position relative to the access port. The door assembly seals the access port when the door assembly is in the closed position and does not seal the access port when the door assembly is in the open position, and the door sensor is operable to emit a signal indicating that the door assembly is in either the closed position or the open position. The depowdering apparatus further includes a blast nozzle positioned within the depowdering chamber and oriented to direct a fluid stream toward the inlet axis of the build inlet. The blast nozzle is laterally spaced from the inlet axis and is coupled to a revolution actuator operable to revolve the blast nozzle about the inlet axis on a travel path encircling the inlet axis. The depowdering apparatus further includes a build elevator arranged below the build inlet in a vertical direction. The build elevator is operable to raise the cake comprising the build part through the build inlet and into the depowdering chamber along the inlet axis as the blast nozzle is revolved about the inlet axis on the travel path with the revolution actuator. The depowdering apparatus further includes a control system communicatively coupled to the build elevator, the door sensor, and a fluid control valve fluidly connected to the blast nozzle. The control system comprising a processor and a non-transitory memory storing computer readable and executable instructions that, when executed by the processor: coordinate actuation of the build elevator with revolution of the blast nozzle about the inlet axis by the revolution actuator; regulate a pressure of the fluid stream emitted by the blast nozzle; receive a signal from the door sensor indicating that the door assembly is in either the closed position or the open position; and stop or prevent at least the blast nozzle from emitting the fluid stream when the signal from the door sensor indicates the door assembly is not in the closed position.

In embodiments, a method for operating a depowdering apparatus for depowdering a cake comprising a build part includes positioning the cake comprising the build part on a build elevator and elevating the cake comprising the build part with the build elevator through a build inlet extending through a bottom surface of a depowdering chamber and along an inlet axis that is substantially vertically oriented. The method further includes revolving a blast nozzle positioned within the depowdering chamber about the inlet axis on a travel path encircling the inlet axis as the cake comprising the build part is raised through the build inlet with the build elevator, wherein the blast nozzle is laterally spaced from the inlet axis. The method further includes projecting a fluid stream from the blast nozzle toward the cake comprising the build part while revolving the blast nozzle about the inlet axis, wherein the fluid stream removes powder material from the cake thereby exposing the build part.

Additional features and advantages of the depowdering apparatuses described herein, the components thereof, and methods of using the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
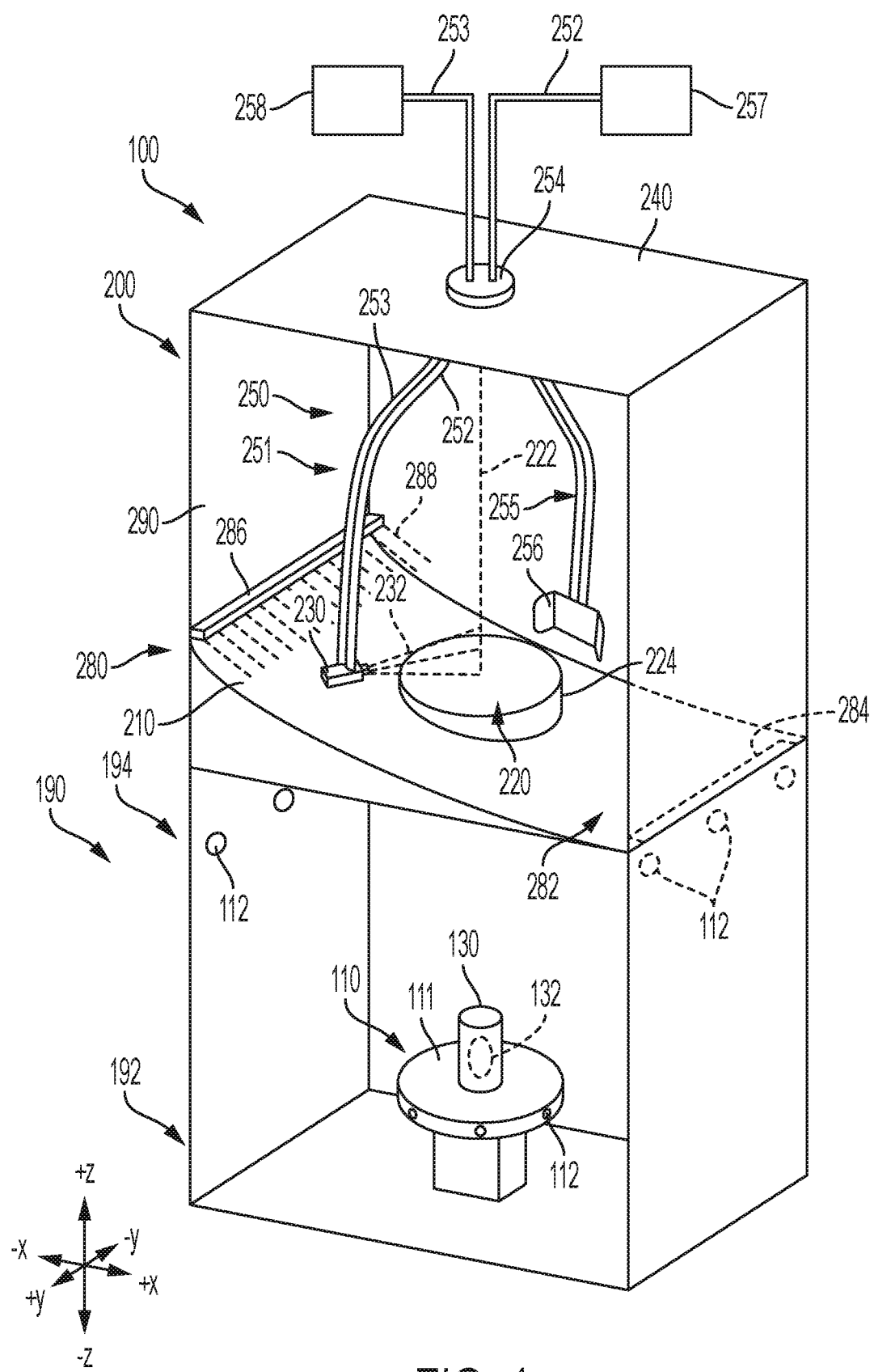
FIG. 1 schematically depicts a depowdering apparatus including a depowdering chamber for depowdering a cake according to one or more embodiments shown and described herein.

Reference will now be made in detail to embodiments of depowdering apparatuses, examples of which are illustrated in the accompanying drawings, and methods of using the same. Whenever possible, the same reference numerals will be used throughout the drawings to refer to the same or like parts. One embodiment of a depowdering apparatus 100 for use in depowdering a cake 130 comprising a build part 132 is schematically depicted in FIG. 1. The depowdering apparatus 100 includes, among other elements, a depowdering chamber 200, a blast nozzle 230, and a build elevator 110. The depowdering chamber 200 includes, among other elements, a bottom surface 210 and a build inlet 220 extending through the bottom surface 210. The build elevator 110 is arranged below the build inlet 220 in a downward vertical direction (i.e., the −Z direction of the coordinate axes depicted in the figures). The blast nozzle 230 is positioned within the depowdering chamber 200 and oriented to direct a fluid stream 232 toward an inlet axis 222 of the build inlet 220. The inlet axis 222 is substantially vertically oriented along the Z axis of the coordinate axes depicted in the figures. The blast nozzle 230 is laterally spaced from the inlet axis 222 and is operable to revolve about the inlet axis 222 on a travel path 236 (shown in FIG. 2) encircling the inlet axis 222. The build elevator 110 is operable to raise the cake 130 having the build part 132 through the build inlet 220 and into the depowdering chamber 200 along the inlet axis 222 as the blast nozzle 230 is revolved about the inlet axis 222 on the travel path 236 (shown in FIG. 2). Various embodiments of depowdering apparatuses, components thereof, and methods of using the same will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, above, below—are made only with reference to the figures as drawn and are not intended to imply absolute orientation unless otherwise specified or apparent from the description.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In additive manufacturing processes the build part, when formed, may be disposed within a cake of excess build material that must be removed in order to complete the building process. The cake is conventionally removed in a depowdering apparatus, where fluid, abrasive material, or both are directed onto the cake to remove the excess build material surrounding the build part. However, conventional depowdering apparatuses and processes may require extensive manual labor and may be time-intensive. As such, the depowdering operation may be a rate-limiting step when building an object by additive manufacturing.

In some conventional depowdering apparatuses and processes, a robotic arm may be mechanically coupled to a blast tube that directs a fluid stream at the cake. However, it may be difficult for the robotic arm to access all portions of the cake during the depowdering operation due to space considerations and/or limitations associated with articulation of the robotic arm. This may necessitate additional manual depowdering operations which may add to the overall depowdering time. For example remnants of the cake may be left on the build part because the robotic arm may not be able to be positioned to remove this powder due to space considerations. These small remnants must then be cleaned by manual blasting, requiring added manual labor and resulting in increased process time, thereby decreasing efficiency and manufacturing throughput. Moreover, the robotic arm may require complex programming instructions to facilitate maneuvering the arm to effectively remove excess powder from the build part. Maneuvering the arm according to these instructions may also add time to the depowdering process.

In the embodiments described herein, to address such concerns, the depowdering apparatus 100 comprises a blast nozzle 230 laterally spaced from the inlet axis 222 and operable to revolve about the inlet axis 222 on a travel path 236 (shown in FIG. 2) encircling the inlet axis 222. Revolution of the blast nozzle 230 may be synchronized with introduction of the cake 130 into the depowdering chamber 200 such that excess powder is removed from the cake 130 as the cake 130 is introduced into the depowdering chamber 200. This may increase the speed of the depowdering operation and reduce manual labor, thereby increasing efficiency and manufacturing throughput.

Figure 2:
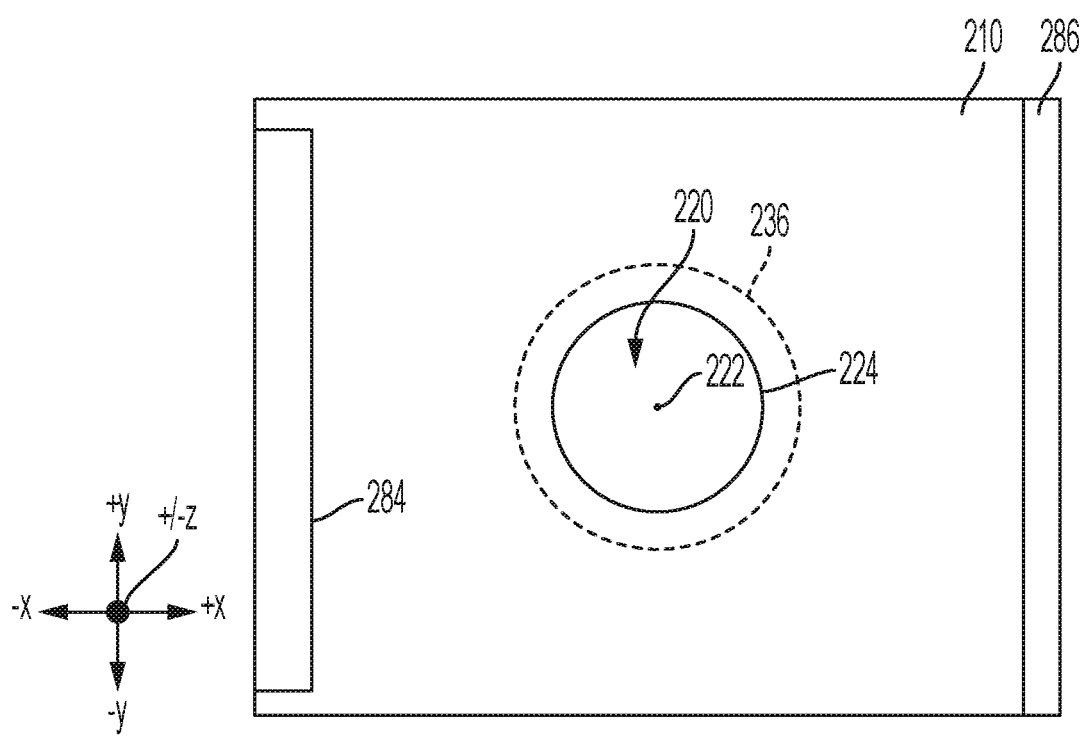
FIG. 2 schematically depicts a top-down view of a depowdering chamber for use with a depowdering apparatus according to one or more embodiments shown and described herein.

Referring now to FIGS. 1 and 2, the depowdering apparatus 100 described herein may comprise a depowdering chamber 200 having a blast nozzle 230 positioned within the depowdering chamber 200. The depowdering chamber 200 may further comprise a bottom surface 210 which includes a build inlet 220 extending there through and through which a cake 130 comprising a build part 132 may be introduced into the depowdering chamber 200 from below the depowdering chamber 200. The build inlet 220 comprises an inlet axis 222 which, in the embodiments described herein, is substantially vertically oriented. The cake 130 comprising the build part 132 is raised into the depowdering chamber 200 through the build inlet 220 along the inlet axis 222. To facilitate raising the cake 130 through the build inlet 220, the depowdering apparatus 100 may further comprise a build elevator 110 arranged below the build inlet 220 in the vertical direction. Accordingly, it should be understood that the build elevator 110 is operable to raise the cake 130 comprising the build part 132 through the build inlet 220 and into the depowdering chamber 200 along the inlet axis 222.

Still referring to FIGS. 1 and 2, the blast nozzle 230 is laterally spaced from the inlet axis 222. That is, the blast nozzle 230 is spaced apart from the inlet axis 222 in the XY plane of the coordinate axes depicted in the figures. In embodiments, the blast nozzle 230 is also laterally spaced from a perimeter 224 of the build inlet 220. In the embodiments described herein, the blast nozzle 230 is operable to revolve about the inlet axis 222 on a travel path 236 encircling the inlet axis 222. In embodiments, the travel path 236 of the blast nozzle 230 is arranged within the depowdering chamber 200 such that the blast nozzle 230 revolves about the inlet axis 222 and the perimeter 224 of the build inlet 220.

In the embodiments described herein, the blast nozzle 230 is oriented in the depowdering chamber 200 to direct a fluid stream 232 toward the inlet axis 222, thereby facilitating depowdering of a cake 130 comprising a build part 132 as the cake 130 is introduced into the depowdering chamber 200 along the inlet axis 222. That is, the blast nozzle 230 is oriented to direct a fluid stream 232 toward the inlet axis 222 as the blast nozzle 230 revolves about the inlet axis 222 on the travel path 236, thereby facilitating depowdering of a cake 130 comprising a build part 132 as the cake 130 is raised through the build inlet 220 and into the depowdering chamber 200 with the build elevator 110.

In embodiments, to facilitate revolution of the blast nozzle 230 about the inlet axis 222, the blast nozzle 230 may be rotatably coupled to a top surface 240 of the depowdering chamber 200 with an arm assembly 250. The arm assembly 250 may include a first revolvable arm 251 and a revolution actuator 254, such as a motor or the like, that rotatably couples the first revolvable arm 251 to the top surface 240 of the depowdering chamber 200. The first revolvable arm 251 is operable to revolve the blast nozzle 230 about the inlet axis 222 on the travel path 236 by actuation of the revolution actuator 254. The first revolvable arm 251 is configured such that the blast nozzle 230 is laterally spaced from the inlet axis 222 of the build inlet 220 (or laterally spaced from the inlet axis 222 and the perimeter 224 of the build inlet 220), as noted herein. In embodiments, the first revolvable arm 251 may include a fluid conduit 252 and an abrasive material conduit 253 which are fluidly coupled to the blast nozzle 230 to supply fluid and abrasive material, respectively, to the blast nozzle 230. In embodiments, the revolution actuator 254 may further include a rotating union through which the fluid conduit 252 and abrasive material conduit 253 are coupled to the blast nozzle 230 to prevent twisting of the fluid conduit 252 and the abrasive material conduit 253 when the arm assembly 250 rotates.

Referring to FIG. 1, the fluid conduit 252 of the first revolvable arm 251 may be fluidly coupled to a fluid source 257 and the abrasive material conduit 253 of the first revolvable arm 251 may be fluidly coupled to an abrasive material source 258. In embodiments, the fluid source 257 may include an air source, such as a compressed air source, which provides air to the blast nozzle 230 through the fluid conduit 252. The abrasive material source 258 may include abrasive material comprising organic or inorganic powder that is delivered to the blast nozzle 230 through the abrasive material conduit 253. In embodiments, the inorganic powder may include metal alloy powder, such as stainless steel powder, cobalt alloy powder, copper alloy powder, diamond catalyst alloy powder, nickel alloy powder, or combinations thereof. The abrasive material may have a particle size of from 0 to 250 μm, from 10 to 250 μm, from 30 to 250 μm, from 50 to 250 μm, from 100 to 250 μm, from 150 to 250 μm, from 200 to 250 μm, from 0 to 200 μm, from 10 to 200 μm, from 30 to 200 μm, from 50 to 200 μm, from 100 to 200 μm, from 150 to 200 μm, from 0 to 150 μm, from 10 to 150 μm, from 30 to 150 μm, from 50 to 150 μm, from 100 to 150 μm, from 0 to 100 μm, from 10 to 100 μm, from 30 to 100 μm, from 50 to 100 μm, from 0 to 50 μm, from 10 to 50 μm, from 30 to 50 μm, from 0 to 30 μm, from 10 to 30 μm, or from 0 to 10 μm. In embodiments, the abrasive material may be substantially similar to or the same as the build material of the cake 130 and the build part 132.

In embodiments, the blast nozzle 230 and the first revolvable arm 251 may be constructed of, for example and without limitation, a metal or a metallic alloy. However, it should be understood that other materials for the blast nozzle 230 and the first revolvable arm 251 are contemplated and possible, such as polymers, ceramics, and/or combinations thereof. In embodiments, the blast nozzle 230 may be constructed of a material similar to or the same as the abrasive material, the build material, or both, to avoid contamination of the powder removed from the cake 130.

Figure 1A:
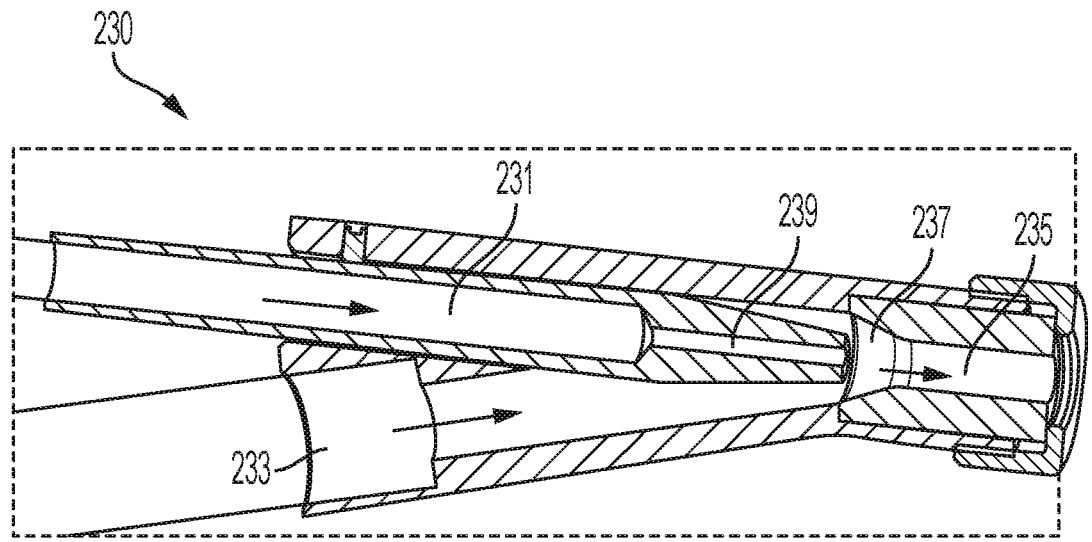
FIG. 1A schematically depicts a cross section of a nozzle for use with a depowdering apparatus according to one or more embodiments shown and described herein.
Figure 1B:
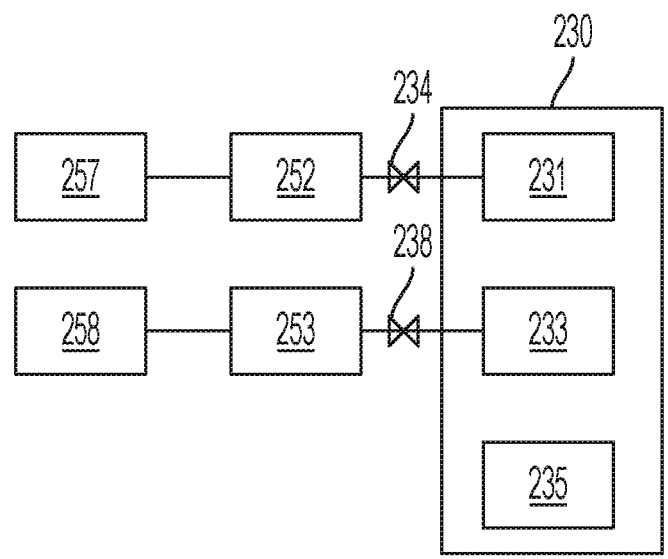
FIG. 1B depicts a block diagram of a nozzle system for use with a depowdering apparatus according to one or more embodiments shown and described herein.

Referring now to FIGS. 1A and 1B, in embodiments, the blast nozzle 230 may comprise a fluid inlet 231, an abrasive material inlet 233, and a mixing channel 235. The fluid inlet 231 is fluidly connected to the fluid source 257 with the fluid conduit 252, and the abrasive material inlet 233 is fluidly connected to the abrasive material source 258 with the abrasive material conduit 253.

As shown in FIG. 1B, a fluid control valve 234 may be fluidly coupled to the fluid conduit 252, to regulate the flow of the fluid from the fluid source 257 to the blast nozzle 230. In embodiments, the fluid control valve 234 may comprise a pneumatic shut off valve. In the embodiments described herein, the fluid control valve 234 may be utilized to vary the pressure of the fluid stream 232 emitted from the blast nozzle 230.

In embodiments, an abrasive material source valve 238 may be fluidly coupled to the abrasive material conduit 253, to regulate the flow of the abrasive material from the abrasive material source 258 to the blast nozzle 230. In embodiments, the abrasive material source valve 238 may comprise a pneumatic shut off valve. The abrasive material source valve 238 may be utilized to vary the amount of abrasive material entrained in the fluid stream 232 emitted from the blast nozzle 230.

Referring again to FIG. 1A, in embodiments, the fluid inlet 231 and the abrasive material inlet 233 may fluidly connect to a first end 237 of the mixing channel 235. As shown in FIG. 1A, the fluid inlet 231 comprises a constricted fluid passage 239 fluidly connected to the first end 237 of the mixing channel 235 and the abrasive material inlet 233, where the fluid inlet 231 is in parallel with the mixing channel 235 and the abrasive material inlet 233 intersects with the first end 237 of the mixing channel 235 at an angle. Due to this fluid connection, the abrasive material inlet 233 may be subject to a pressure drop at the first end 237 of the mixing channel 235 from a Venturi effect when fluid is flowing through the fluid inlet 231. The resultant pressure drop causes abrasive material to be sucked into the mixing channel 235 and entrained in the fluid flowing through mixing channel 235 which is subsequently emitted from the blast nozzle 230 as fluid stream 232 (FIG. 1).

More specifically, a pressure of the abrasive material source 258 may be greater than the pressure at the first end 237 of the mixing channel 235 when fluid is flowing through the blast nozzle 230. The abrasive material within the abrasive material source 258 may be sucked into the mixing channel 235 due to the pressure drop described above when the abrasive material source valve 238 is open and the fluid is flowing through the blast nozzle 230. Additionally, when the fluid exits the constricted fluid passage 239 and enters the first end 237 of the mixing channel 235, the fluid pressure increases as the fluid velocity decreases, and the flow of the fluid may become turbulent, thereby mixing the fluid with the abrasive material and causing the abrasive material to become entrained in the fluid stream 232 directed by the blast nozzle 230.

In embodiments, the abrasive material may be prevented from mixing with the fluid at the first end 237 of the mixing channel 235 with the abrasive material source valve 238 by closing the abrasive material source valve 238. As such, when the abrasive material source valve 238 is closed, the blast nozzle 230 may direct the fluid stream 232 that comprises only the fluid from the fluid source 257, and when the abrasive material source valve 238 is open, the fluid stream 232 may comprise abrasive material entrained in the fluid stream 232.

Figure 3:
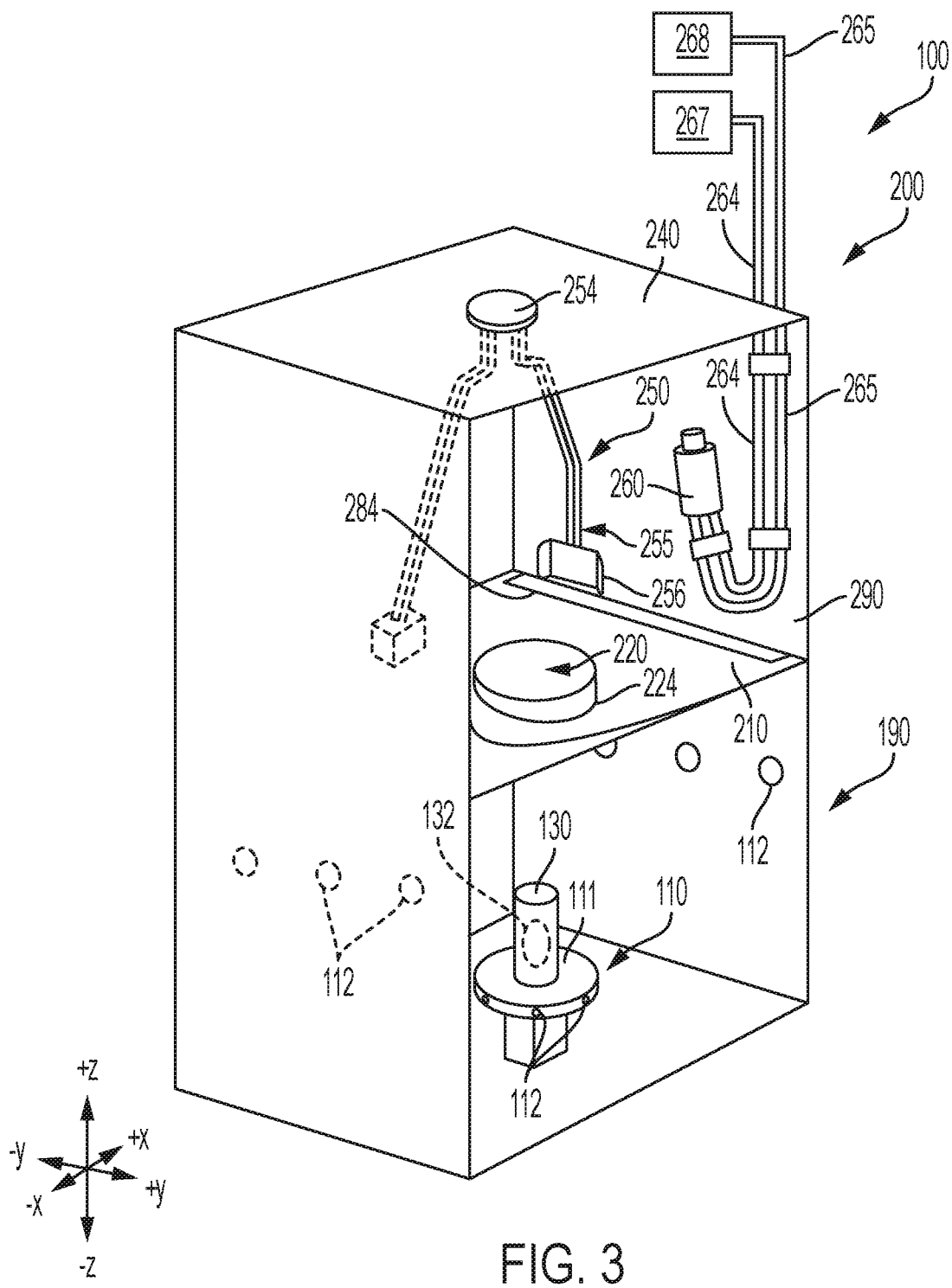
FIG. 3 schematically depicts a cross section of a depowdering apparatus including a depowdering chamber for depowdering a cake according to one or more embodiments shown and described herein.

Referring now to FIGS. 1 and 3, in embodiments, the arm assembly 250 may further include a second revolvable arm 255 laterally spaced from the first revolvable arm 251 in the XY plane of the coordinate axes depicted in the figures. In embodiments, the first revolvable arm 251 and the second revolvable arm 255 are spaced apart from one another along a diameter of the build inlet 220. A blast shield 256 may coupled to the second revolvable arm 255, such that the blast shield may be revolved about the inlet axis 222 (or about the inlet axis 222 and the perimeter 224 of the build inlet 220) on the travel path 236 (FIG. 2) with the revolution actuator 254 of the arm assembly 250. In embodiments, the blast shield 256 may be arranged on the second revolvable arm 255 such that the fluid stream 232 from the blast nozzle 230 is directed towards the blast shield 256 as the blast shield 256 is revolved about the inlet axis 222 on the travel path 236. In embodiments, the blast shield 256 may have a concave profile relative to the inlet axis 222, and may be formed from the same material as the abrasive material described herein.

In embodiments which include a blast shield 256, the blast shield 256 may block at least a portion of the fluid stream 232 from impinging on a sidewall 290 of the depowdering chamber 200 and eroding the sidewall 290. This reduces damage to the depowdering apparatus 100 and also prevents contamination of powder removed from the cake 130 comprising the build part 132. In embodiments, the blast shield 256 may block at least a portion of the fluid stream 232 from impinging on the sidewall 290 of the depowdering chamber 200 and redirect the fluid stream 232 toward a bottom surface 210 of the depowdering chamber 200. In embodiments, the sidewall 290 may at least partially enclose the depowdering chamber 200. The phrase "at least partially enclose," as used herein, means that the sidewall 290 bounds the depowdering chamber 200 on at least one side. For example, the sidewall 290 bounds at least the vertical sides of the depowdering chamber 200 (i.e., the sides of the depowdering chamber 200 extending in the +/−Z direction of the coordinate axes depicted in the figures) in the embodiment depicted in FIG. 1. In this embodiment, the sidewall 290 may be, for example, rectangular or square in horizontal cross section enclosing the depowdering chamber 200. In embodiments (not depicted), the sidewall 290 may form a cylinder, a half cylinder, or a quarter cylinder in horizontal cross section (i.e., a cross section defined by the X-Y plane in the coordinate axes depicted in the figures) partially enclosing the depowdering chamber 200.

Referring again to FIG. 1, in embodiments, the bottom surface 210 of the depowdering chamber 200 may be arranged to promote the collection of powder material removed from the cake 130 comprising the build part 132 as well as abrasive material entrained in the fluid stream 232 emitted from the blast nozzle 230. For example, in embodiments, the bottom surface 210 of the depowdering chamber 200 may be downwardly sloped from an elevated side 280 of the bottom surface to a recovery side 282 of the bottom surface 210 such that powder material removed from the cake 130 and abrasive material from the fluid stream 232 collects on the recovery side 282 of the bottom surface 210 due to gravity.

In embodiments, the bottom surface 210 of the depowdering chamber 200 further comprises a powder recovery outlet 284 located on the recovery side 282 of the bottom surface. The powder recovery outlet 284 may be utilized to remove powder material removed from the cake 130 and abrasive material from the fluid stream 232 from the depowdering chamber 200. For example, in embodiments, the powder recovery outlet 284 may be fluidly coupled to a vacuum source (not depicted) such that powder material removed from the cake 130 and abrasive material from the fluid stream 232 is suctioned from the depowdering chamber 200 through the powder recovery outlet 284 and collected for reuse, either as abrasive material and/or as build material for use in a subsequent additive manufacturing operation.

In embodiments, the depowdering chamber 200 may further include an air knife 286 laterally positioned on the sidewall 290 and fluidly coupled to the fluid source 257. In embodiments, the air knife 286 may be positioned on the sidewall 290 above the elevated side 280 of the bottom surface 210 and oriented to direct an air curtain 288 toward the bottom surface 210 of the depowdering chamber 200. The air curtain 288 directed from the air knife 286 encourages powder removed from the cake 130 and abrasive material from the fluid stream 232 to collect on the recovery side 282 for subsequent removal through the powder recovery outlet 284.

Figure 1C:
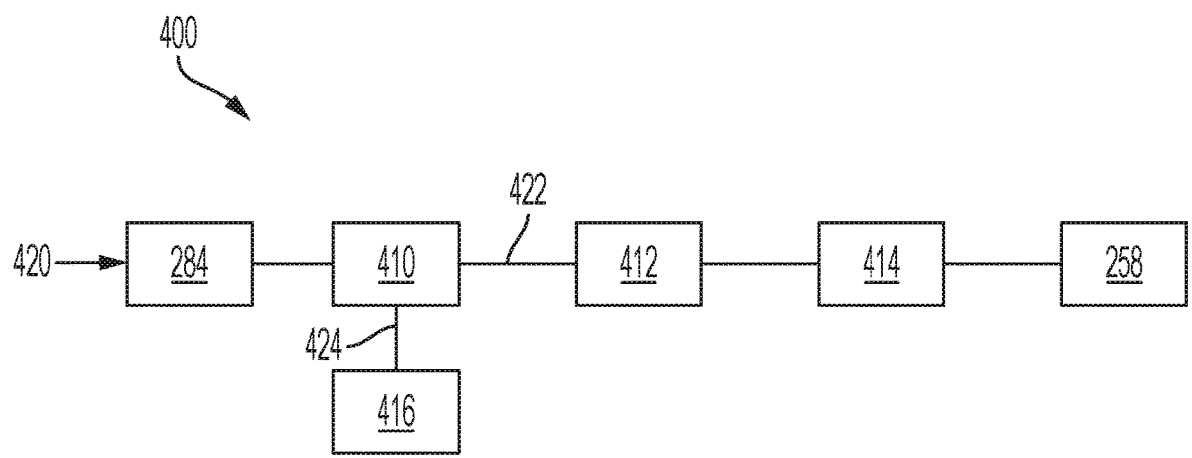
FIG. 1C depicts a block diagram of an abrasive material recycling system for use with a depowdering apparatus according to one or more embodiments shown and described herein.

Referring to FIGS. 1 and 1C, in embodiments, powder material removed from the cake 130 and abrasive material from the fluid stream 232 (collectively, powder material 420) may be recycled for further use, as noted herein. A block diagram of the recycling process 400 is schematically depicted in FIG. 1C. As depicted in FIG. 1C, powder material 420 flows into and through the powder recover outlet 284 by vacuum suction. The powder material 420 is then directed into a cyclone separator 410, where the powder material 420 is separated by size and weight. In embodiments, the larger (and therefore heavier) particles 422 pass through the cyclone separator 410 to a magnetic separator 412, which may remove magnetic particles from the larger particles 422. The larger particles 422 then pass to intermediate storage 414, and then are added to the abrasive material source 258. The smaller (and therefore lighter) particles 424 are sent to a fine filter 416. The material collected in the abrasive material source 258 may be recycled for use as abrasive material for the blast nozzle 230 while smaller particles 424 may be recycled for use in a subsequent additive manufacturing operation (i.e., as build material for forming a build part 132 and/or cake 130).

Figure 5:
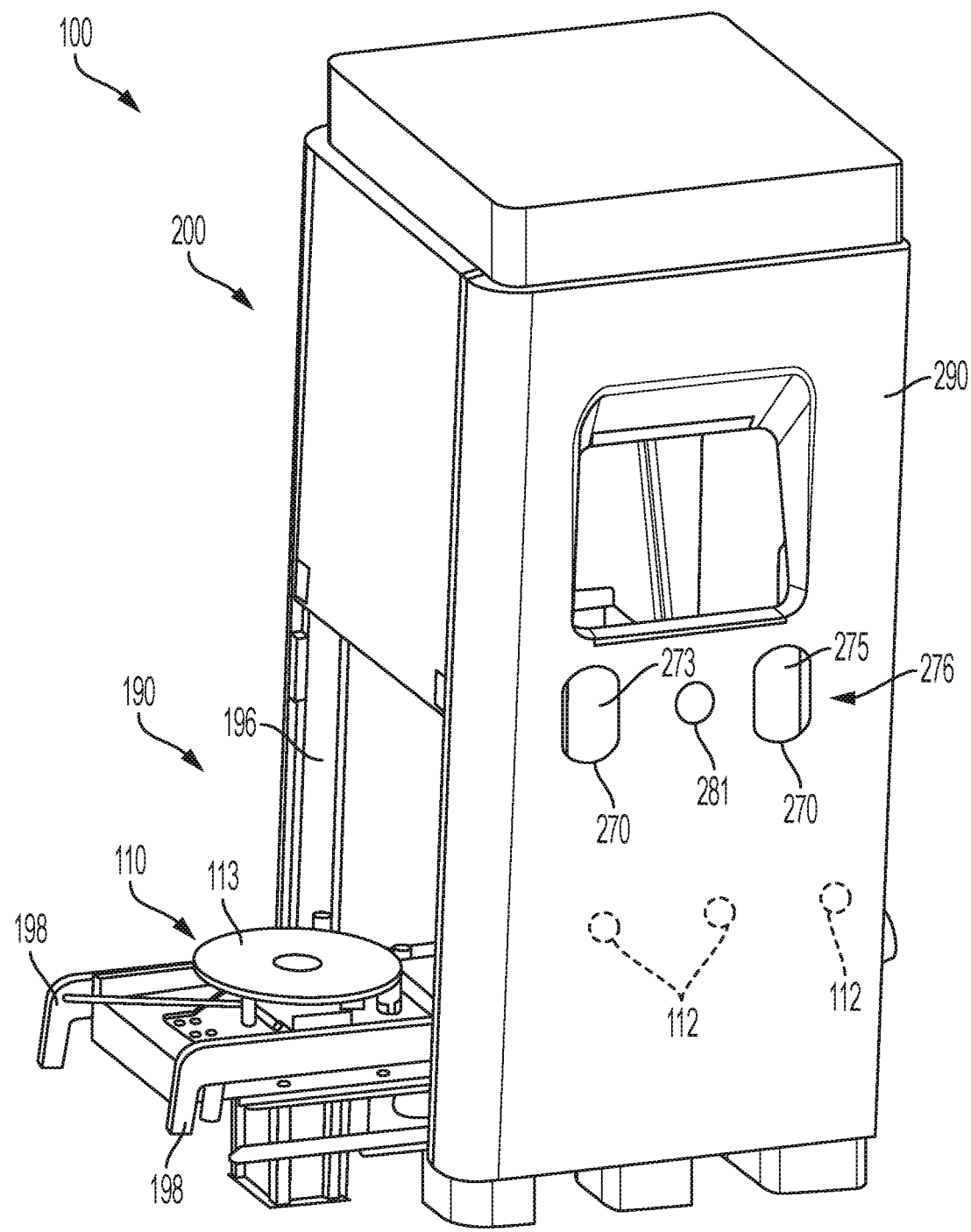
FIG. 5 schematically depicts a perspective view of a depowdering apparatus according to one or more embodiments shown and described herein.
Figure 6:
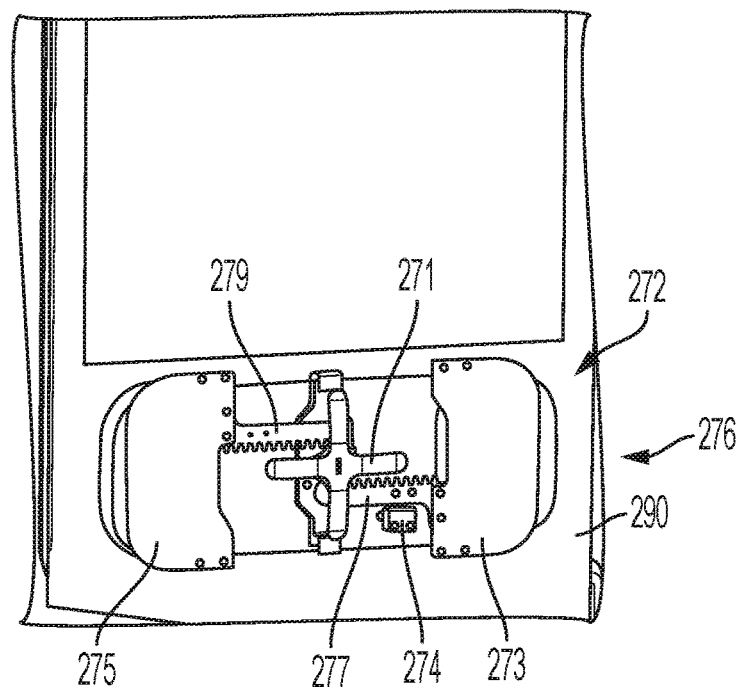
FIG. 6 schematically depicts an internal view of a portion of a sidewall of a depowdering chamber of the depowdering apparatus of FIG. 5 according to one or more embodiments shown and described herein.
Figure 7:
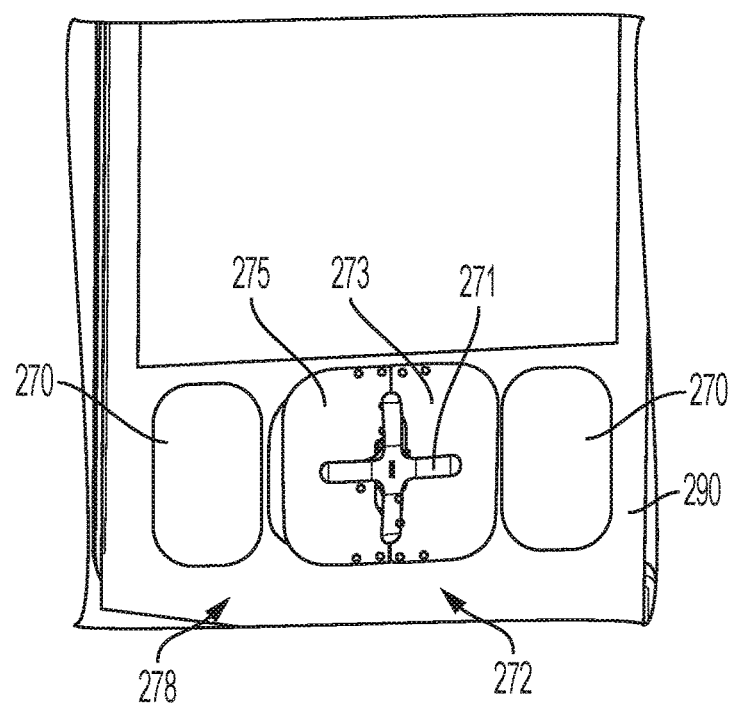
FIG. 7 schematically depicts an internal view of a portion of a sidewall of a depowdering chamber of the depowdering apparatus of FIG. 5 according to one or more embodiments shown and described herein.

Referring now to FIGS. 5-7, in embodiments, the depowdering chamber 200 may further include an access port 270 extending through the sidewall 290, a door assembly 272, and a door sensor 274. The access port 270 may include a single access port (not depicted), two access ports 270 (as depicted in the figures), or more than two access ports. In embodiments, the access port(s) 270 may comprise glove inserts (not shown) to allow an operator to insert his/her hands into the depowdering chamber 200 to perform manual operations. The door assembly 272 may include a closed position 276 relative to the access port(s) 270 (as depicted in FIGS. 5 and 6) and an open position 278 relative to the access port(s) 270 (as depicted in FIG. 7). The door assembly 272 seals the access port(s) 270 when the door assembly 272 is in the closed position 276, and does not seal the access port(s) 270 when the door assembly 272 is in the open position 278, thereby allowing an operator to access the depowdering chamber 200 through the access port(s) 270.

The door assembly 272 may include a number of panels. For example and without limitation, the door assembly 272 may include a single panel (not depicted), two panels 273, 275 (as depicted), or more than two panels. As a specific example, in embodiments where the depowdering chamber 200 includes a single access port 270, the door assembly 272 may include one panel to seal the single access port. Alternatively, in embodiments where the access port 270 includes two access ports 270 (as depicted), the door assembly 272 may include one panel, two panels 273, 275, or more than two panels. The door assembly 272 may use one panel to seal the two access ports 270, where the one panel comprises an area large enough to prohibit access through both access ports (not shown). In embodiments where the access port 270 includes two panels, as shown in FIGS. 5-7, the door assembly 272 may include a first panel 273 and a second panel 275. In this embodiment, the door assembly 272 may comprise a rack and pinion connection as shown, where the first panel 273 is mechanically coupled to a first rack 277, and the second panel 275 is mechanically coupled to a second rack 279. The first rack 277 and the second rack 279 are positioned on opposite sides of and engaged with a pinion 271. Rotation of the pinion 271 (such as with knob 281 (FIG. 5) coupled to pinion 271) displaces the first panel 273 and the second panel 275 relative to one another, thereby moving the door assembly 272 from either the closed position 276 to the open position 278 or from the open position 278 to the closed position 276.

In embodiments, the door sensor 274 may be operatively associated with the door assembly 272 and able detect whether the door assembly 272 is in the closed position 276 or not in the closed position (i.e., in the open position 278). In other embodiments, the door sensor 274 may detect whether the door assembly 272 is in the closed position or in the open position 278. The door sensor 274 may be operable to emit a signal indicating that the door assembly 272 is in the closed position 276 or not in the closed position 276 (i.e., in the open position 278). The door sensor 274 may be, for example and without limitation, a magnetic switch, a proximity switch, a reed switch, a limit switch, a photoelectric switch or the like. For example and without limitation, in embodiments the door sensor may be an MN202S magnetically coded sensor available from Ifm Efector, Inc. of Malvern, Pa. The door sensor 274 may be used to prevent or discontinue operation of the depowdering apparatus when the door assembly 272 is not in the closed position 276. For example and without limitation, the door sensor 274 may be used to prevent or discontinue operation of the blast nozzle 230 and/or the arm assembly 250 when the door assembly 272 is not in the closed position 276.

As referenced previously, the depowdering apparatus 100 further comprises a build elevator 110 arranged below the build inlet 220 in a vertical direction. Referring now to FIG. 5, the build elevator 110 may comprise an elevator stage 113. In embodiments, the build elevator 110 comprises a telescoping actuator, such as the TL3 lifting column available from TiMotion Technology Co. Ltd. of New Taipei City, Taiwan. In embodiments where the build elevator 110 comprises a telescoping actuator, the telescoping actuator may aid in decreasing the overall height of the depowdering apparatus 100 such that the depowdering chamber 200 may be positioned closer to the ground, eliminating the need for the use of stairs and/or platforms to facilitate access to the depowdering chamber 200 by a user.

While the build elevator has been described herein as comprising a telescoping actuator, it should be understood that other embodiments are contemplated and possible. For example, in an alternative embodiment (not depicted), the build elevator 110 comprises a ball screw coupled to a motor with a drive linkage rotatably coupling the ball screw to the armature of the motor. In this embodiment, rotation of the motor rotates the ball screw, thereby raising or lowering the build elevator 110. However, it should be understood that other embodiments are contemplated and possible.

Figure 9A:
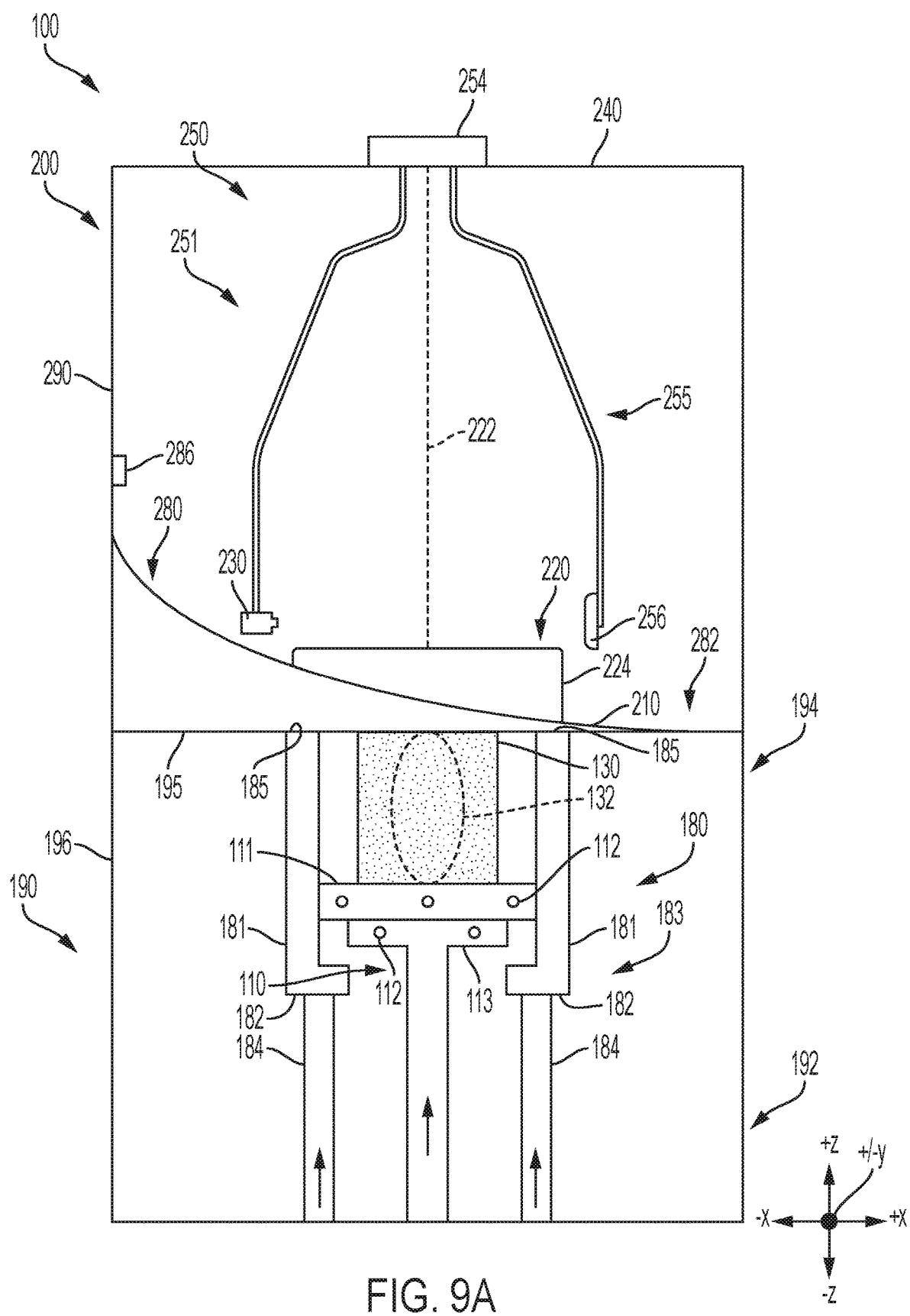
FIG. 9A schematically depicts the depowdering apparatus of FIG. 1 in use according to one or more embodiments shown and described herein.
Figure 9B:
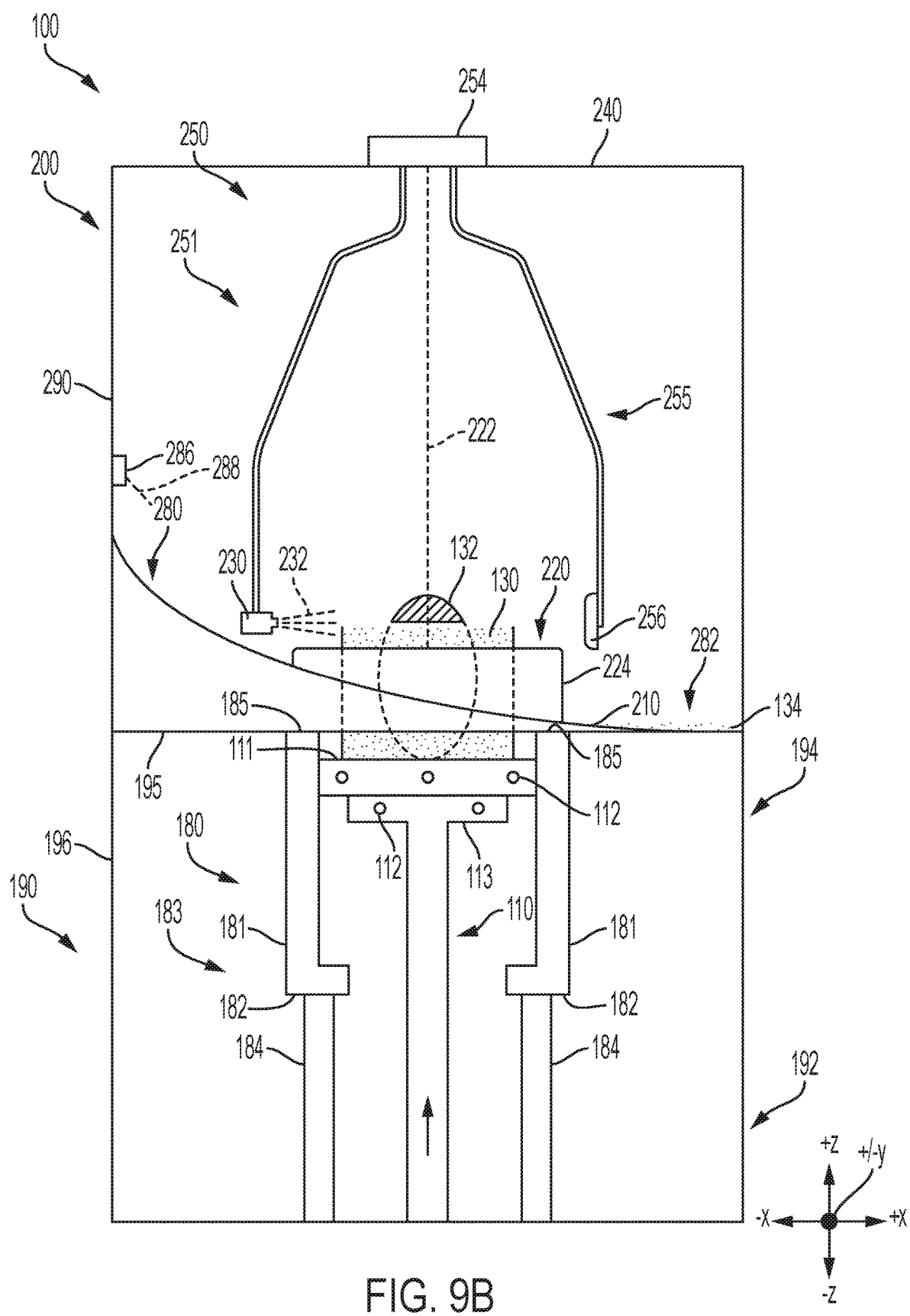
FIG. 9B schematically depicts the depowdering apparatus of FIG. 1 in use according to one or more embodiments shown and described herein.

Referring to FIGS. 1, 3, 5, 9A, and 9B, in embodiments, the depowdering apparatus 100 comprises a build tank chamber 190 positioned below the depowdering chamber 200 in the vertical direction. The build tank chamber 190 is configured to receive a build tank 180 (shown in FIGS. 9A and 9B) in which the cake 130 comprising a build part 132 is disposed. Referring to FIGS. 9A and 9B, in embodiments, the build tank 180 may include a housing 181 comprising a platform 111 on which the cake 130 comprising the build part 132 is positioned. The platform 111 is moveable with respect to the housing 181 of the build tank 180. When the build tank 180 is situated in the build tank chamber 190, the housing 181 of the build tank 180 is secured in place in the build tank chamber 190 and the platform 111 is engaged with the elevator stage 113 of the build elevator 110 such that the platform 111 (and hence the cake 130 and build part 132) can be raised with the build elevator 110 independent of the housing 181 of the build tank 180. In embodiments, flanges 182 proximate the bottom 183 of the build tank 180 may be engaged with tank engagement features 184 to mechanically couple the build tank 180 to the build tank chamber 190. The tank engagement features 184 may be, for example, hydraulic or pneumatic cylinders moveable in a vertical direction with respect to the build tank chamber 190. In embodiments (not shown), the flanges 182 of the build tank 180 may comprise connectors for coupling the tank engagement features 184 of the build tank chamber 190 to the flanges 182 of the build tank 180. The connectors may comprise interference fit connectors, pneumatic connectors, parallel groove connectors, or combinations of these.

Alternatively or additionally, in embodiments, the top 185 of the build tank 180 may be mechanically coupled to the top 195 of the build tank chamber 190 (as shown in FIGS. 9A and 9B). In embodiments (not shown), the top 185 of the build tank 180 may comprise connectors for coupling the top 195 of the build tank chamber 190 to the top 185 of the build tank. The connectors may comprise interference fit connectors, pneumatic connectors, parallel groove connectors, or combinations of these.

Referring again to FIG. 5, in embodiments, the build elevator 110 may be slidably coupled to a sidewall 196 of the build tank chamber 190 with extendable guides 198 to facilitate sliding the build elevator 110 in and out of the build tank chamber 190. This allows for improved access to the build elevator 110, such as when a build tank is being placed on or removed from the build elevator 110 before or after a depowdering operation. In embodiments, the extendable guides 198 may include telescopic linear guides with ball bearings, such as Telerace guides available from Rollon®, headquartered in N.J., USA. In embodiments (not shown), the build elevator 110 may comprise connectors for coupling the platform 111 of the build tank 180 to the elevator stage 113 of the build elevator 110 (as shown in FIGS. 9A and 9B). The connectors may comprise interference fit connectors, pneumatic connectors, parallel groove connectors, or combinations of these.

Referring to FIGS. 1 and 9A, in embodiments, the build elevator 110 may have elevator sensors 112 for determining the location of the build elevator 110, and in particular the position of the platform 111. For example, the build elevator 110 may include elevator sensors 112 for detecting a vertical position of the build elevator 110 relative to the build inlet 220. The elevator sensors 112 may be positioned on the surface of the build elevator (as shown), for example, on the elevator stage 113 (as shown), or disposed within the build elevator 110 (not shown) to detect a height of the build elevator 110. In embodiments, the elevator sensors 112 may be positioned on the platform 111. Additionally or alternatively, in embodiments, elevator sensors 112 may be arranged around the build tank chamber 190 to detect a height of the build elevator 110 (or to detect a height of the platform 111) relative to the build inlet 220. The elevator sensors 112 may be positioned inside the build tank chamber 190 proximate to a lower end 192 of the build tank chamber 190 (not shown), proximate to an upper end 194 of the build tank chamber 190 (as shown), or in between the lower end 192 and the upper end 194 (not shown). The elevator sensors 112 may, in some embodiments, include a limit switch. In embodiments, the limit switch may comprise a capacitive limit switch, an inductive limit switch, a photoelectric limit switch, a mechanical limit switch, a pulse counter, an incremental sensor, a magnetic scale, or combinations thereof.

Figure 4A:
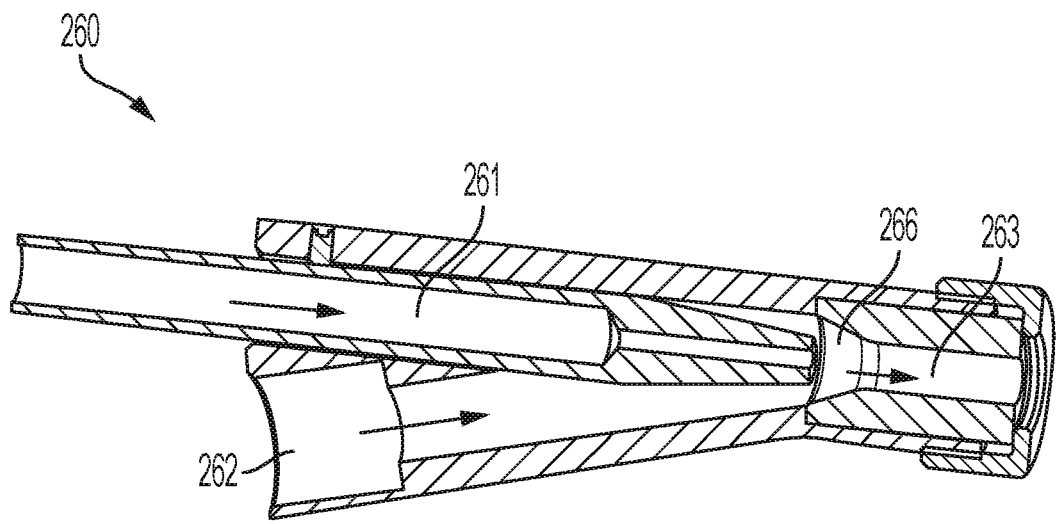
FIG. 4A schematically depicts a cross section of a handheld nozzle for use with a depowdering apparatus according to one or more embodiments shown and described herein.
Figure 4B:
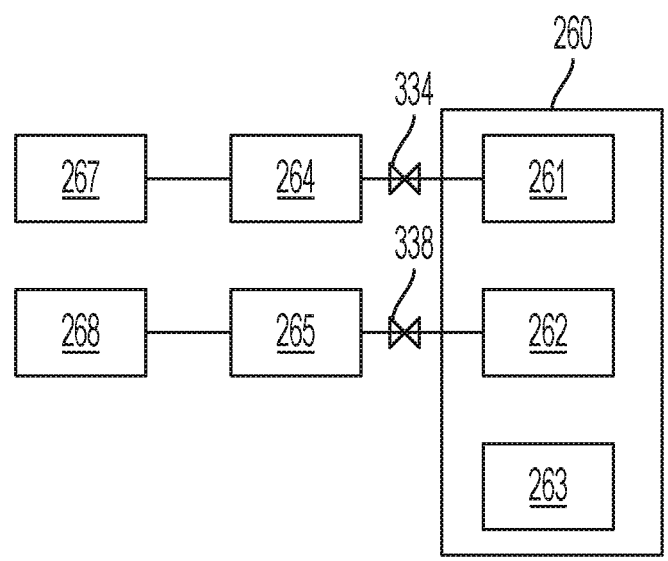
FIG. 4B depicts a block diagram of a nozzle system (including the handheld nozzle of FIG. 4A) for use with a depowdering apparatus according to one or more embodiments shown and described herein.

Referring to FIGS. 3, 4A, and 4B, in embodiments, the depowdering chamber 200 may further include a handheld nozzle 260 fluidly connected to a fluid supply 267 with a fluid supply conduit 264 and fluidly connected to an abrasive material supply 268 with an abrasive material supply conduit 265. In embodiments, the handheld nozzle 260 may be mechanically coupled to the sidewall 290 of the depowdering chamber 200 (as shown). Alternatively, the handheld nozzle 260 may be mechanically coupled to the top surface 240 of the depowdering chamber 200 (not shown) or the bottom surface 210 of the depowdering chamber 200 (not shown). In embodiments, the fluid supply 267 may include an air source, such as a compressed air source, which provides air to the handheld nozzle 260 through the fluid supply conduit 264. The abrasive material supply 268 may include abrasive material comprising organic or inorganic powder that is delivered to the handheld nozzle 260 through the abrasive material supply conduit 265. In embodiments, the abrasive material may be substantially similar to or the same as the build material of the cake 130 and the build material of the build part 132. The fluid supply 267 and the abrasive material supply 268 may be distinct from or the same as the fluid source 257 and the abrasive material source 258 previously described.

In embodiments, the handheld nozzle 260 may have an internal functionality substantially similar to or the same as the blast nozzle 230. The handheld nozzle 260 may comprise a handheld fluid inlet 261, a handheld abrasive material inlet 262, and a handheld mixing channel 263. The handheld fluid inlet 261 may be fluidly connected to the fluid supply 267 with the fluid supply conduit 264, and the handheld abrasive material inlet 262 may be fluidly connected to the abrasive material supply 268 with the abrasive material supply conduit 265. A handheld valve 334 may be fluidly coupled to the fluid supply conduit 264, to regulate the flow of the fluid from the fluid supply 267 to the handheld nozzle 260. In embodiments, the handheld valve 334 may comprise a pneumatic shut off valve. In the embodiments described herein, the handheld valve 334 may be utilized to vary the pressure of the fluid stream emitted from the handheld nozzle 260.

An abrasive material supply valve 338 may be fluidly coupled to the abrasive material supply conduit 265, to regulate the flow of the abrasive material from the abrasive material supply 368 to the handheld nozzle 360. In embodiments, the abrasive material supply valve 338 may comprise a pneumatic shut off valve. The abrasive material supply valve 338 may be utilized to vary the pressure of the abrasive material entrained in the fluid stream emitted from the handheld nozzle 260. The handheld valve 334 and the abrasive material supply valve 338 may be the same as or substantially similar to any of the valves previously described.

In embodiments, the handheld fluid inlet 261 and the handheld abrasive material inlet 262 may fluidly connect to a first end 266 of the handheld mixing channel 263. As shown in FIG. 4A, the handheld fluid inlet 261 comprises a constricted fluid supply passage 269 fluidly connected to the first end 266 of the handheld mixing channel 263 and the handheld abrasive material inlet 262, where the handheld fluid inlet 261 is in parallel with the handheld mixing channel 263 and the handheld abrasive material inlet 262 intersects with the first end 266 of the handheld mixing channel 263 at an angle. Due to this fluid connection, the handheld abrasive material inlet 262 may be subject to a pressure drop at the first end 266 of the handheld mixing channel 263 from a Venturi effect when fluid is flowing through the handheld fluid inlet 261. The resultant pressure drop causes abrasive material to be sucked into the handheld mixing channel 263 and entrained in the fluid flowing through handheld mixing channel 263 which is subsequently emitted from the handheld nozzle 260 as a fluid stream.

More specifically, a pressure of the abrasive material supply 268 may be greater than the pressure at the first end 266 of the handheld mixing channel 263 when fluid is flowing through the handheld nozzle 260. The abrasive material within the abrasive material supply 268 may be sucked into the handheld mixing channel 263 due to the pressure drop described above when the abrasive material supply valve 338 is open and the fluid is flowing through the handheld nozzle 260. Additionally, when the fluid exits the constricted fluid supply passage 269 and enters the first end 266 of the handheld mixing channel 263, the fluid pressure increases as the fluid velocity decreases, and the flow of the fluid may become turbulent, thereby mixing the fluid with the abrasive material and causing the abrasive material to become entrained in the fluid stream emitted by the handheld nozzle 260.

In embodiments, the abrasive material may be prevented from mixing with the fluid at the first end 266 of the handheld mixing channel 263 with the abrasive material supply valve 338 by closing the abrasive material supply valve 338. As such, when the abrasive material supply valve 338 is closed, the handheld nozzle 260 may direct a fluid stream that comprises only the fluid from the fluid supply 267, and when the abrasive material supply valve 338 is open, the fluid stream may comprise abrasive material entrained in the fluid stream.

Figure 8:
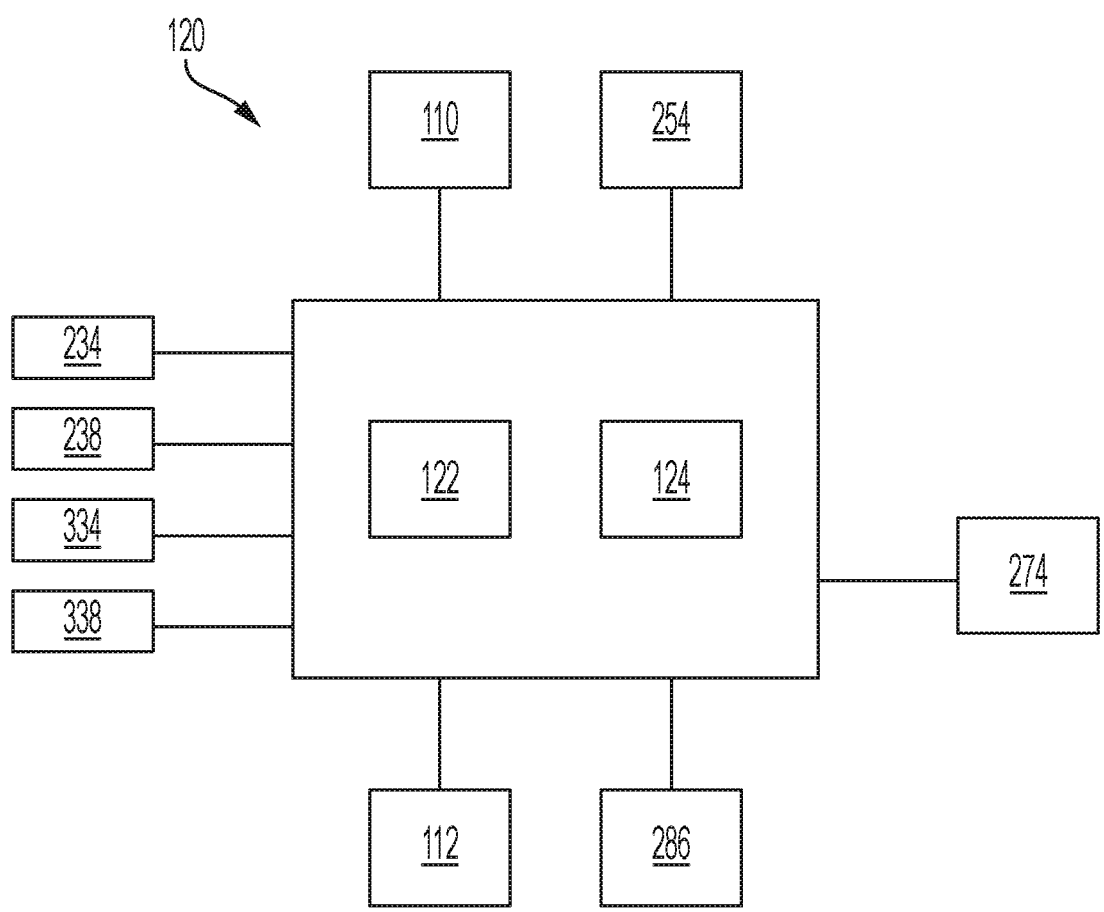
FIG. 8 is a block diagram of a control system for a depowdering apparatus according to one or more embodiments shown and described herein.

Referring to FIGS. 1 and 8, a control system 120 for controlling the depowdering apparatus 100 is schematically depicted. The control system 120 may be communicatively coupled to the build elevator 110, the revolution actuator 254, the door sensor 274, the elevator sensors 112, the fluid control valve 234, the abrasive material source valve 238, the handheld valve 334, the abrasive material supply valve 338, and the air knife 286.

In the embodiments described herein, the control system 120 comprises a processor 122 communicatively coupled to a memory 124. The processor 122 may include any processing component(s), such as a central processing unit or the like, configured to receive and execute computer readable and executable instructions stored in, for example, the memory 124. In the embodiments described herein, the computer readable and executable instructions for controlling the depowdering apparatus 100 are stored in the memory 124 of the control system 120. The memory 124 is a non-transitory computer readable memory. The memory 124 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

In the embodiments described herein, the processor 122 of the control system 120 is configured to provide control signals to (and thereby actuate) the build elevator 110, the revolution actuator 254, the door sensor 274, the elevator sensors 112, the fluid control valve 234, the abrasive material source valve 238, the handheld valve 334, the abrasive material supply valve 338, and the air knife 286. The control system 120 may also be configured to receive signals from the build elevator 110, the fluid control valve 234, the revolution actuator 254, the door sensor 274, and the elevator sensors 112 and, based on these signals, actuate the build elevator 110, the fluid control valve 234, and the revolution actuator 254.

In embodiments, the blast nozzle 230 may be configured to emit the fluid stream 232 at variable pressure. The computer readable and executable instructions, when executed by the processor 122, may regulate the pressure of the fluid stream 232 emitted by the blast nozzle 230 with the fluid control valve 234. The pressure of the fluid stream 232 may be adjusted in the range from 3 to 10 bar, from 3 to 8 bar, from 3 to 6 bar, from 3 to 4 bar, from 4 to 10 bar, from 4 to 8 bar, from 4 to 6 bar, from 6 to 10 bar, from 6 to 8 bar, or from 8 to 10 bar with the fluid control valve 234. In embodiments, the computer readable and executable instructions, when executed by the processor 122, may regulate the pressure of the fluid stream 232 in coordination with the actuation of the build elevator 110, the revolution rate of the blast nozzle 230, or combinations thereof.

In embodiments, the revolution actuator 254 may be configured to rotate the blast nozzle 230 about the inlet axis 222 at a variable revolution rate. The computer readable and executable instructions, when executed by the processor 122, may regulate the revolution rate of the blast nozzle 230 about the inlet axis 222 with the revolution actuator 254. The revolution rate may range from 1.5 to 15 revolutions per minute (rpm), from 1.5 to 13 rpm, from 1.5 to 10 rpm, from 1.5 to 8 rpm, from 1.5 to 6 rpm, from 1.5 to 4 rpm, from 1.5 to 2 rpm, from 2 to 15 rpm, from 2 to 13 rpm, from 2 to 10 rpm, from 2 to 8 rpm, from 2 to 6 rpm, from 2 to 4 rpm, from 4 to 15 rpm, from 4 to 13 rpm, from 4 to 10 rpm, from 4 to 8 rpm, from 4 to 6 rpm, from 6 to 15 rpm, from 6 to 13 rpm, from 6 to 10 rpm, from 6 to 8 rpm, from 8 to 15 rpm, from 8 to 13 rpm, from 8 to 10 rpm, from 10 to 15 rpm, from 10 to 13 rpm, or from 13 to 15 rpm. In embodiments, the computer readable and executable instructions, when executed by the processor 122, coordinate actuation of the build elevator 110 with the revolution rate of the blast nozzle 230 about the inlet axis 222 with the revolution actuator 254, the pressure of the fluid stream 232 emitted by the blast nozzle 230, or combinations thereof.

In embodiments, the build elevator 110 may be configured to raise the cake 130 comprising the build part 132 at a variable elevation rate. The computer readable and executable instructions, when executed by the processor 122, may regulate the elevation rate of the build elevator 110. The elevation rate may range from 0.0001 to 0.01 meters per second (m/s), from 0.0005 to 0.01 m/s, from 0.001 to 0.01 m/s, from 0.005 to 0.01 m/s, from 0.0001 to 0.005 m/s, from 0.0005 to 0.005 m/s, from 0.001 to 0.005 m/s, from 0.0001 to 0.001 m/s, from 0.0005 to 0.001 m/s, or from 0.0001 to 0.0005 m/s. Additionally, in embodiments, the computer readable and executable instructions, when executed by the processor 122, may coordinate the pressure of the fluid stream 232 emitted by the blast nozzle 230 with the revolution rate of the blast nozzle 230, the elevation rate of the build elevator 110, or combinations thereof.

Referring to FIGS. 1 and 5-8, the computer readable and executable instructions, when executed by the processor 122, may receive a signal from the door sensor 274 indicating that the door assembly 272 is in either the closed position 276 or not in the closed position 276 (i.e., in the open position 278), as previously described. In embodiments, when the signal from the door sensor 274 indicates the door assembly 272 is not in the closed position 276, the computer readable and executable instructions, when executed by the processor 122, may stop or prevent the blast nozzle 230 from emitting the fluid stream 232; stop or prevent the blast nozzle 230 from revolving around the inlet axis 222; stop or prevent the build elevator 110 from raising the cake 130 comprising the build part 132 through the build inlet 220; or combinations thereof.

The operation of the depowdering apparatus 100 will now be described in further detail with specific reference to FIGS. 1, 8, 9A, and 9B.

Referring initially to FIG. 9A, depowdering apparatus 100 is shown at the initiation of a depowdering process. The depowdering process may begin with positioning the cake 130 comprising the build part 132 on the build elevator 110. In embodiments, the cake 130 may be positioned on the platform 111 of the build elevator 110 such that the cake 130 is centered around the inlet axis 222 of the build inlet 220 once the cake 130 is raised through the build inlet 220 by the build elevator 110.

Referring to FIGS. 9A and 9B, the cake 130 comprising the build part 132 is elevated with the build elevator 110 through the build inlet 220 and along the inlet axis 222 as indicated by the arrow. As the cake 130 comprising the build part 132 is raised through the build inlet 220 with the build elevator 110, the blast nozzle 230 is revolved about the inlet axis 222.

While the blast nozzle 230 is revolved about the inlet axis 222, the fluid stream 232 is projected from the blast nozzle 230 toward the cake 130 comprising the build part 132. The fluid stream 232 contacts the cake 130 and removes build material 134 from the cake 130 thereby exposing the build part 132, as shown in FIG. 9B. The build part 132 may be fully exposed, as shown in FIG. 9B, or may be partially exposed (not shown). The phrase "partially exposed," as used herein, means the some of the build material 134 of the cake 130 may remain on the build part 132.

As the build material 134 is removed from the cake 130 by the fluid stream 232, the build material 135 (and abrasive material from the fluid stream 232) may collect at the recovery side 282 of the depowdering chamber 200 due to the downward slope of the bottom surface 210. In embodiments, the air curtain 288 emitted from air knife 286 aids in directing the build material 134 and abrasive material from the elevated side 280 to the recovery side 282 of the bottom surface 210. In embodiments, the build material 134 and the abrasive material may then be recycled using the recycling process 400 (shown in FIG. 1C) previously described.

Referring to FIGS. 8 and 9B, as previously described, the control system 120 may be communicatively coupled to the build elevator 110, the revolution actuator 254, the door sensor 274, the elevator sensors 112, the fluid control valve 234, the abrasive material source valve 238, the handheld valve 334, the abrasive material supply valve 338, and the air knife 286. In embodiments, a computer-aided design (CAD) three-dimensional model of the geometry of the build part 132 may be uploaded to the control system 120 and the control system 120 may modify the depowdering process based on the CAD model of the geometry of the build part 132 and the position of the build part 132 with respect to the build inlet 220.

For example, in embodiments, the computer readable and executable instructions, when executed by the processor 122, vary the pressure of the fluid stream 232 emitted by the blast nozzle 230 based on the geometry of the build part 132 and the position of the build part 132 relative to the build inlet 220; vary the revolution rate of the blast nozzle 230 about the inlet axis 222 based on the geometry of the build part 132 and the position of the build part 132 relative to the build inlet 220; vary the elevation rate of the build elevator 110 based on the geometry of the build part 132 and the position of the build part 132 relative to the build inlet 220; or combinations thereof.

By way of further example, and not by way of limitation, the control system may modify the pressure of the fluid stream 232, the revolution rate of the blast nozzle 230, and the elevation rate of the build elevator 110 as shown in Table 1.

TABLE 1

Geometry-Dependent Depowdering Process Modifications

| Geometry Feature | Fluid Stream Pressure | Blast Nozzle Revolution Rate | Build Elevator Elevation Rate |
| --- | --- | --- | --- |
| Smooth profile | Decrease | Increase | Increase |
| Rough profile | Increase | Decrease | Decrease |
| Part breadth - wide | Decrease | N/A | N/A |
| Part breadth - narrow | Increase | N/A | N/A |

Without intending to be bound by theory, when the build part 132 has a smooth surface profile, it is contemplated that it requires less pressure to remove the build material 134 of the cake 130 from the build part 132 because the build material 134 more easily falls away from the smooth surface rather than becoming entrapped or adhered to surface features. However, when the build part 132 has a rough surface profile, such as when the build part 132 has a variety of large and/or small surface features, it is contemplated that it may require greater pressure to dislodge the build material 134 of the cake 130 from the build part 132 because the build material 134 may become lodged within the surface features of the build part 132. Accordingly, the pressure of the fluid stream emitted by the blast nozzle 230 may be varied based on the geometry of the build part 132 that is exposed to the fluid stream 232 of the blast nozzle 230 as the cake 130 is raised through the build inlet 220.

Similarly, when the build part 132 has a smooth surface profile, the blast nozzle revolution rate may be increased because the build material 134 may more easily fall away from the build part 132. However, when the build part 132 has a rough surface profile, the blast nozzle revolution rate may be decreased because the build material 134 may become lodged within the rough surface of the build part 132 and may require longer contact time with the fluid stream 322 to dislodge from the rough surface of the build part 132.

Regarding the elevation rate of the build elevator 110, the elevation rate may be increased when the build part 132 has a smooth surface profile as the build material 134 may more easily fall away from the build part 132 thereby requiring less exposure time to the fluid stream 232 emitted by the blast nozzle. In embodiments, the revolution rate of the blast nozzle 230 and the elevation rate of the build elevator 110 may be directly related such that when the revolution rate increases, the elevation rate increases, and when the revolution rate decreases, the elevation rate decreases.

When the build part 132 has a wide breadth, meaning that the surface(s) of the build part 132 is relatively close to the blast nozzle 230, it is contemplated that it requires less pressure to remove the build material 134 of the cake 130 from the build part 132 than if the surface of the build part 132 were farther away from the blast nozzle 230 (i.e., when the build part 132 has a narrow breadth). Similarly, when the build part 132 has a narrow breadth, meaning that the surface of the build part 132 is relatively far from the blast nozzle 230, it is contemplated that it requires greater pressure to remove the build material 134 of the cake 130 from the build part 132 than if the surface of the build part 132 were closer to the blast nozzle 230.

It is contemplated that the breadth of the build part 132 (i.e. the proximity of the surface of the build part 132 to the blast nozzle 230) may vary over the course of a single revolution of the blast nozzle 230 about the inlet axis 222, and that the pressure of the fluid stream 232 may likewise vary in accordance with the geometry of the build part 132, specifically the breadth of the build part 132, as the blast nozzle 230 is rotated about the inlet axis 222.

Referring to FIGS. 3, 5-8, and 9B, in embodiments where the build part 132 is partially exposed, the handheld nozzle 260 (shown in FIG. 3), may be used to remove the remaining build material 134 from the build part 132. An operator may manually access the handheld nozzle 260 through the access port 270 when the door assembly 272 is in the open position 278. As previously described, the control system 120 (shown in FIG. 8) may determine if the door assembly 272 is in the closed position 276 or the open position 278. If the signal from the door sensor 274 indicates the door assembly 272 is not in the closed position 276, the control system 120 may stop or prevent the blast nozzle 230 from at least one of emitting the fluid stream 232 and revolving around the inlet axis 222. This prevents the operator from interfering with the depowdering process and vice-versa.

Further aspects of the embodiments are provided by the subject matter of the following clauses:

Clause 1. A depowdering apparatus for depowdering a cake comprising a build part comprises a depowdering chamber comprising a bottom surface and a build inlet extending through the bottom surface, the build inlet comprising an inlet axis that is substantially vertically oriented; a blast nozzle positioned within the depowdering chamber and oriented to direct a fluid stream toward the inlet axis, wherein the blast nozzle is laterally spaced from the inlet axis and operable to revolve about the inlet axis on a travel path encircling the inlet axis; and a build elevator arranged below the build inlet in a vertical direction, wherein the build elevator is operable to raise the cake comprising the build part through the build inlet and into the depowdering chamber along the inlet axis as the blast nozzle is revolved about the inlet axis on the travel path.

Clause 2. The apparatus of any preceding clause wherein the blast nozzle is rotatably coupled to a top surface of the depowdering chamber with an arm assembly comprising a first revolvable arm, wherein the first revolvable arm is operable to revolve the blast nozzle about the inlet axis on the travel path.

Clause 3. The apparatus of any preceding clause wherein the blast nozzle is laterally spaced from a perimeter of the build inlet and the first revolvable arm is operable to revolve the blast nozzle about the perimeter of the build inlet.

Clause 4. The apparatus of any preceding clause wherein: the first revolvable arm comprises a fluid conduit and an abrasive material conduit which are fluidly coupled to the blast nozzle to supply the fluid stream to the blast nozzle; the fluid conduit is fluidly coupled to a fluid source; the abrasive material conduit is fluidly coupled to an abrasive material source; and the fluid stream comprises abrasive material entrained in the fluid stream.

Clause 5. The apparatus of any preceding clause further comprising a control system communicatively coupled to the build elevator and a revolution actuator coupled to the arm assembly, the control system comprising a processor and a non-transitory memory storing computer readable and executable instructions that, when executed by the processor, provide control signals to the revolution actuator and the build elevator such that rotation of the blast nozzle about the inlet axis with the revolution actuator is coordinated with elevation of the build elevator.

Clause 6. The apparatus of any preceding clause wherein the control system is communicatively coupled to a fluid control valve fluidly coupled to the blast nozzle, wherein the computer readable and executable instructions, when executed by the processor, cause the fluid control valve to coordinate a pressure of the fluid stream emitted by the blast nozzle with rotation of the blast nozzle about the inlet axis with the revolution actuator and elevation of the build elevator Clause 7. The apparatus of any preceding clause wherein: the arm assembly further comprises a second revolvable arm spaced apart from the first revolvable arm; a blast shield is rotatably coupled to the top surface of the depowdering chamber with the second revolvable arm, the blast shield being arranged on the second revolvable arm such that the fluid stream from the blast nozzle is directed towards the blast shield; and the second revolvable arm is operable to revolve the blast shield about the inlet axis on the travel path.

Clause 8. The apparatus of any preceding clause wherein the blast shield has a concave profile relative to the inlet axis.

Clause 9. The apparatus of any preceding clause wherein the fluid stream from the blast nozzle comprises abrasive material entrained in the fluid stream and the blast shield is formed from the same material as the abrasive material.

Clause 10. The apparatus of any preceding clause wherein the blast nozzle is configured to emit the fluid stream at variable pressure.

Clause 11. The apparatus of any preceding clause wherein the depowdering chamber further comprises a handheld nozzle comprising a fluid inlet, an abrasive material inlet, and a mixing channel, wherein: the fluid inlet is fluidly connected to a fluid supply with a fluid supply conduit; the abrasive material inlet is fluidly connected to an abrasive material supply with an abrasive material supply conduit;

the fluid inlet and the abrasive material inlet fluidly connect to a first end of the mixing channel; and the handheld nozzle is configured to emit a handheld nozzle fluid stream comprising fluid or fluid comprising abrasive material entrained in the handheld nozzle fluid stream.

Clause 12. The apparatus of any preceding clause wherein: the depowdering chamber further comprises an access port extending through a sidewall at least partially enclosing the depowdering chamber, a door assembly, and a door sensor; the door assembly comprises a closed position relative to the access port, wherein the door assembly seals the access port when the door assembly is in the closed position and an open position wherein the door assembly does not seal the access port; and the door sensor is operable to emit a signal indicating that the door assembly is in either the closed position or the open position.

Clause 13. The apparatus of any preceding clause wherein the door sensor is communicatively coupled to a control system comprising a processor and a non-transitory memory storing computer readable and executable instructions that, when executed by the processor: receive a signal from the door sensor indicating that the door assembly is in either the closed position or the open position, and stop or prevent the blast nozzle from at least one of emitting the fluid stream and revolving around the inlet axis when the signal from the door sensor indicates the door assembly is not in the closed position.

Clause 14. The apparatus of any preceding clause wherein: the door assembly comprises a first panel and a second panel; the first panel comprises a first rack; the second panel comprises a second rack; and the first rack and the second rack are positioned on opposite sides of and engaged with a pinion, wherein rotation of the pinion displaces the first panel and the second panel relative to one another from either the closed position to the open position or the open position to the closed position.

Clause 15. The apparatus of any preceding clause wherein the access port comprises glove inserts.

Clause 16. The apparatus of any preceding clause wherein the build elevator comprises elevator sensors communicatively coupled to a control system to detect a height of the build elevator relative to the build inlet.

Clause 17. The apparatus of any preceding clause wherein the build elevator is disposed within a build tank chamber, the build tank chamber having elevator sensors arranged around the build tank chamber to detect a height of the build elevator relative to the build inlet.

Clause 18. The apparatus of any preceding clause wherein the build elevator and the elevator sensors are communicatively coupled to a control system and the build elevator is configured to have a variable elevation rate.

Clause 19. The apparatus of any preceding clause wherein the build elevator comprises a telescoping actuator.

Clause 20. The apparatus of any preceding clause wherein the bottom surface of the depowdering chamber is downwardly sloped from an elevated side to a recovery side of the bottom surface, the recovery side of the bottom surface comprising a powder recovery outlet extending through the bottom surface of the depowdering chamber.

Clause 21. The apparatus of any preceding clause wherein the depowdering chamber further comprises an air knife positioned on a sidewall of the depowdering chamber above the elevated side of the bottom surface of the depowdering chamber, wherein the air knife is oriented to direct an air curtain toward the bottom surface of the depowdering chamber.

Clause 22. A depowdering apparatus for depowdering a cake comprising a build part comprises a depowdering chamber comprising an access port, a door assembly, a door sensor, a bottom surface and a build inlet extending through the bottom surface of the depowdering chamber, wherein: the build inlet comprises an inlet axis that is substantially vertically oriented, the access port extends through a sidewall at least partially enclosing the depowdering chamber, the door assembly comprises a closed position and an open position relative to the access port, wherein the door assembly seals the access port when the door assembly is in the closed position and does not seal the access port when the door assembly is in the open position, and the door sensor is operable to emit a signal indicating that the door assembly is in either the closed position or the open position; a blast nozzle positioned within the depowdering chamber and oriented to direct a fluid stream toward the inlet axis of the build inlet, wherein the blast nozzle is laterally spaced from the inlet axis and is coupled to a revolution actuator operable to revolve the blast nozzle about the inlet axis on a travel path encircling the inlet axis; a build elevator arranged below the build inlet in a vertical direction, wherein the build elevator is operable to raise the cake comprising the build part through the build inlet and into the depowdering chamber along the inlet axis as the blast nozzle is revolved about the inlet axis on the travel path with the revolution actuator; and a control system communicatively coupled to the build elevator, the door sensor, and a fluid control valve fluidly connected to the blast nozzle, the control system comprising a processor and a non-transitory memory storing computer readable and executable instructions that, when executed by the processor: coordinate actuation of the build elevator with revolution of the blast nozzle about the inlet axis by the revolution actuator; regulate a pressure of the fluid stream emitted by the blast nozzle; and receive a signal from the door sensor indicating that the door assembly is in either the closed position or the open position; and stop or prevent at least the blast nozzle from emitting the fluid stream when the signal from the door sensor indicates the door assembly is not in the closed position.

Clause 23. The apparatus of any preceding clause wherein the computer readable and executable instructions, when executed by the processor, stop or prevent the blast nozzle from revolving around the inlet axis when the signal from the door sensor indicates the door assembly is not in the closed position.

Clause 24. The apparatus of any preceding clause wherein the computer readable and executable instructions, when executed by the processor, stop or prevent the build elevator from raising the cake comprising the build part through the build inlet when the signal from the door sensor indicates the door assembly is not in the closed position.

Clause 25. The apparatus of any preceding clause wherein the computer readable and executable instructions, when executed by the processor, vary the pressure of the fluid stream emitted by the blast nozzle based on a geometry of the build part.

Clause 26. The apparatus of any preceding clause wherein the computer readable and executable instructions, when executed by the processor, vary a revolution rate of the blast nozzle about the inlet axis based on a geometry of the build part.

Clause 27. The apparatus of any preceding clause wherein the computer readable and executable instructions, when executed by the processor, vary an elevation rate of the build elevator based on a geometry of the build part.

Clause 28. The apparatus of any preceding clause wherein the computer readable and executable instructions, when executed by the processor, vary a revolution rate of the blast nozzle about the inlet axis and an elevation rate of the build elevator based on a geometry of the build part.

Clause 29. The apparatus of any preceding clause wherein the computer readable and executable instructions, when executed by the processor, vary the pressure of the fluid stream emitted by the blast nozzle, a revolution rate of the blast nozzle about the inlet axis, and an elevation rate of the build elevator based on a geometry of the build part.

Clause 30. The apparatus of any preceding clause wherein the blast nozzle is rotatably coupled to a top surface of the depowdering chamber with an arm assembly comprising a first revolvable arm, wherein the first revolvable arm is operable to revolve the blast nozzle about the inlet axis on the travel path.

Clause 31. The apparatus of any preceding clause wherein the blast nozzle is laterally spaced from a perimeter of the build inlet and the first revolvable arm is operable to revolve the blast nozzle about the perimeter of the build inlet.

Clause 32. The apparatus of any preceding clause wherein: the first revolvable arm comprises a fluid conduit and an abrasive material conduit which are fluidly coupled to the blast nozzle to supply the fluid stream to the blast nozzle; the fluid conduit is fluidly coupled to a fluid source; the abrasive material conduit is fluidly coupled to an abrasive material source; and the fluid stream comprises abrasive material entrained in the fluid stream.

Clause 33. The apparatus of any preceding clause wherein: the arm assembly further comprises a second revolvable arm spaced apart from the first revolvable arm; a blast shield having a concave profile relative to the inlet axis is rotatably coupled to the top surface of the depowdering chamber with the second revolvable arm, the blast shield being arranged on the second revolvable arm such that the fluid stream from the blast nozzle is directed towards the blast shield; and the second revolvable arm is operable to revolve the blast shield about the inlet axis on the travel path.

Clause 34. The apparatus of any preceding clause wherein: the depowdering chamber further comprises a handheld nozzle comprising a fluid inlet, an abrasive material inlet, and a mixing channel, wherein: the fluid inlet is fluidly connected to a fluid supply by a fluid supply conduit; the abrasive material inlet is fluidly connected to an abrasive material supply with an abrasive material supply conduit; the fluid inlet and the abrasive material inlet fluidly connect to a first end of the mixing channel; and the handheld nozzle is configured to emit a handheld nozzle fluid stream comprising fluid or fluid comprising abrasive material entrained in the handheld nozzle fluid stream.

Clause 35. The apparatus of any preceding clause wherein: the door assembly comprises a first panel and a second panel; the first panel comprises a first rack; the second panel comprises a second rack; and the first rack and the second rack are positioned on opposite sides of and engaged with a pinion, wherein rotation of the pinion displaces the first panel and the second panel relative to one another from either the closed position to the open position or the open position to the closed position.

Clause 36. The apparatus of any preceding clause wherein the build elevator comprises elevator sensors communicatively coupled to the control system to detect a height of the build elevator relative to the build inlet.

Clause 37. The apparatus of any preceding clause wherein the build elevator is disposed within a build tank chamber, the build tank chamber having elevator sensors arranged around the build tank chamber to detect a height of the build elevator relative to the build inlet.

Clause 38. The apparatus of any preceding clause wherein: the bottom surface of the depowdering chamber is downwardly sloped from an elevated side to a recovery side of the bottom surface, the recovery side of the bottom surface comprising a powder recovery outlet extending through the bottom surface of the depowdering chamber; and the depowdering chamber further comprises an air knife positioned on the sidewall of the depowdering chamber above the elevated side of the bottom surface of the depowdering chamber, wherein the air knife is oriented to direct an air curtain toward the bottom surface of the depowdering chamber.

Clause 39. A method for operating a depowdering apparatus for depowdering a cake comprising a build part, the method comprising: positioning the cake comprising the build part on a build elevator; elevating the cake comprising the build part with the build elevator through a build inlet extending through a bottom surface of a depowdering chamber and along an inlet axis that is substantially vertically oriented; revolving a blast nozzle positioned within the depowdering chamber about the inlet axis on a travel path encircling the inlet axis as the cake comprising the build part is raised through the build inlet with the build elevator, wherein the blast nozzle is laterally spaced from the inlet axis; and projecting a fluid stream from the blast nozzle toward the cake comprising the build part while revolving the blast nozzle about the inlet axis, wherein the fluid stream removes powder material from the cake thereby exposing the build part.

Clause 40. The method of any preceding clause further comprising varying a pressure of the fluid stream incident on the cake based on a geometry of the build part.

Clause 41. The method of any preceding clause further comprising varying an elevation rate of the cake based on a geometry of the build part.

Clause 42. The method of any preceding clause wherein the blast nozzle is rotatably coupled to a top surface of the depowdering chamber with an arm assembly comprising a first revolvable arm, and wherein revolving the blast nozzle comprises revolving the first revolvable arm.

Clause 43. The method of any preceding clause further comprising varying a revolution rate of the arm assembly based on a geometry of the build part.

Clause 44. The method of any preceding clause wherein: the depowdering chamber further comprises an access port extending through a sidewall at least partially enclosing the depowdering chamber, a door assembly, and a door sensor; the door assembly comprises a closed position and an open position relative to the access port, wherein the door assembly seals the access port when the door assembly is in the closed position does not seal the access port when the door assembly is in the open position; and the method further comprises: determining if the door assembly is in the closed position or the open position; and stopping or preventing the blast nozzle from at least one of emitting the fluid stream and revolving around the inlet axis when the signal from the door sensor indicates the door assembly is not in the closed position.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A depowdering apparatus for depowdering a cake comprising a build part, the depowdering apparatus comprising:
a depowdering chamber comprising a bottom surface and a build inlet extending through the bottom surface, the build inlet comprising an inlet axis that is substantially vertically oriented;
a blast nozzle positioned within the depowdering chamber and oriented to direct a fluid stream toward the inlet axis, wherein:
the blast nozzle is laterally spaced from the inlet axis and operable to revolve about the inlet axis on a travel path encircling the inlet axis,
the blast nozzle is coupled to an arm assembly comprising a first revolvable arm,
the first revolvable arm is operable to revolve the blast nozzle about the inlet axis on the travel path,
the arm assembly further comprises a second revolvable arm spaced apart from the first revolvable arm,
a blast shield is coupled to the second revolvable arm, the blast shield being arranged on the second revolvable arm such that the fluid stream from the blast nozzle is directed towards the blast shield,
the second revolvable arm is operable to revolve the blast shield about the inlet axis on the travel path, and
the fluid stream from the blast nozzle comprises abrasive material entrained in the fluid stream and the blast shield is formed from the same material as the abrasive material; and
a build elevator arranged below the build inlet in a vertical direction, wherein the build elevator is operable to raise the cake comprising the build part through the build inlet and into the depowdering chamber along the inlet axis as the blast nozzle is revolved about the inlet axis on the travel path.

2. The depowdering apparatus of claim 1, wherein the blast nozzle is rotatably coupled to a top surface of the depowdering chamber with the arm assembly.

3. The depowdering apparatus of claim 2, wherein:
the blast nozzle is laterally spaced from a perimeter of the build inlet and the first revolvable arm is operable to revolve the blast nozzle about the perimeter of the build inlet;
the first revolvable arm comprises a fluid conduit and an abrasive material conduit which are fluidly coupled to the blast nozzle to supply the fluid stream to the blast nozzle;
the fluid conduit is fluidly coupled to a fluid source;
the abrasive material conduit is fluidly coupled to an abrasive material source; and
the fluid stream comprises abrasive material entrained in the fluid stream.

4. The depowdering apparatus of claim 2, further comprising a control system communicatively coupled to the build elevator and a revolution actuator coupled to the arm assembly, the control system comprising a processor and a non-transitory memory storing computer readable and executable instructions that, when executed by the processor, provide control signals to the revolution actuator and the build elevator such that rotation of the blast nozzle about the inlet axis with the revolution actuator is coordinated with elevation of the build elevator.

5. The depowdering apparatus of claim 4, wherein the control system is communicatively coupled to a fluid control valve fluidly coupled to the blast nozzle, wherein the computer readable and executable instructions, when executed by the processor, cause the fluid control valve to coordinate a pressure of the fluid stream emitted by the blast nozzle with rotation of the blast nozzle about the inlet axis with the revolution actuator and elevation of the build elevator.

6. The depowdering apparatus of claim 2, wherein:
a blast shield is rotatably coupled to the top surface of the depowdering chamber with the second revolvable arm.

7. The depowdering apparatus of claim 1, wherein the depowdering chamber further comprises a handheld nozzle comprising a fluid inlet, an abrasive material inlet, and a mixing channel, wherein:
the fluid inlet is fluidly connected to a fluid supply with a fluid supply conduit;
the abrasive material inlet is fluidly connected to an abrasive material supply with an abrasive material supply conduit;
the fluid inlet and the abrasive material inlet fluidly connect to a first end of the mixing channel; and
the handheld nozzle is configured to emit a handheld nozzle fluid stream comprising fluid or fluid comprising abrasive material entrained in the handheld nozzle fluid stream.

8. The depowdering apparatus of claim 1, wherein:
the build elevator comprises elevator sensors communicatively coupled to a control system to detect a height of the build elevator relative to the build inlet;
the build elevator is disposed within a build tank chamber, the build tank chamber having elevator sensors arranged around the build tank chamber to detect a height of the build elevator relative to the build inlet; and
the build elevator and the elevator sensors are communicatively coupled to a control system and the build elevator is configured to have a variable elevation rate.

9. A method for operating a depowdering apparatus for depowdering a cake comprising a build part, the method comprising:
positioning the cake comprising the build part on a build elevator;
elevating the cake comprising the build part with the build elevator through a build inlet extending through a bottom surface of a depowdering chamber and along an inlet axis that is substantially vertically oriented;
revolving a blast nozzle positioned within the depowdering chamber about the inlet axis on a travel path encircling the inlet axis as the cake comprising the build part is raised through the build inlet with the build elevator, wherein:
the blast nozzle is laterally spaced from the inlet axis,
the blast nozzle is coupled to an arm assembly comprising a first revolvable arm,
the first revolvable arm is operable to revolve the blast nozzle about the inlet axis on the travel path,
the arm assembly further comprises a second revolvable arm spaced apart from the first revolvable arm,
a blast shield is coupled to the second revolvable arm, the blast shield being arranged on the second revolvable arm such that a fluid stream from the blast nozzle is directed towards the blast shield,
the second revolvable arm is operable to revolve the blast shield about the inlet axis on the travel path, and the fluid stream from the blast nozzle comprises abrasive material entrained in the fluid stream and the blast shield is formed from the same material as the abrasive material; and projecting the fluid stream from the blast nozzle toward the cake comprising the build part while revolving the blast nozzle about the inlet axis, wherein the fluid stream removes powder material from the cake thereby exposing the build part.

10. The method of claim 9, further comprising varying a pressure of the fluid stream incident on the cake, varying an elevation rate of the cake, or both, based on a geometry of the build part.

11. The method of claim 9, wherein the blast nozzle is rotatably coupled to a top surface of the depowdering chamber with the arm assembly, and wherein revolving the blast nozzle comprises revolving the first revolvable arm, further comprising varying a revolution rate of the arm assembly based on a geometry of the build part.

12. The method of claim 9, wherein:

the depowdering chamber further comprises an access port extending through a sidewall at least partially enclosing the depowdering chamber, a door assembly, and a door sensor;

the door assembly comprises a closed position and an open position relative to the access port, wherein the door assembly seals the access port when the door assembly is in the closed position does not seal the access port when the door assembly is in the open position; and the method further comprises:
 determining if the door assembly is in the closed position or the open position; and
stopping or preventing the blast nozzle from at least one of emitting the fluid stream and revolving around the inlet axis when the signal from the door sensor indicates the door assembly is not in the closed position.

* * * * *